US010181118B2

(12) United States Patent
Salomon et al.

(10) Patent No.: US 10,181,118 B2
(45) Date of Patent: *Jan. 15, 2019

(54) MOBILE COMMUNICATIONS DEVICE PAYMENT METHOD UTILIZING LOCATION INFORMATION

(71) Applicant: LOOKOUT, INC., San Francisco, CA (US)

(72) Inventors: Ariel Salomon, San Francisco, CA (US); Kevin Patrick Mahaffey, San Francisco, CA (US)

(73) Assignee: LOOKOUT, INC., San Francisco, CA (US)

( * ) Notice: Subject to any disclaimer, the term of this patent is extended or adjusted under 35 U.S.C. 154(b) by 997 days.

This patent is subject to a terminal disclaimer.

(21) Appl. No.: 14/311,101

(22) Filed: Jun. 20, 2014

(65) Prior Publication Data
US 2014/0304165 A1 Oct. 9, 2014

Related U.S. Application Data

(63) Continuation of application No. 13/212,055, filed on Aug. 17, 2011, now Pat. No. 8,788,881.

(51) Int. Cl.
G06Q 20/32 (2012.01)
G06Q 20/40 (2012.01)
(Continued)

(52) U.S. Cl.
CPC ....... *G06Q 20/3224* (2013.01); *G06Q 20/401* (2013.01); *H04W 4/00* (2013.01);
(Continued)

(58) Field of Classification Search
CPC .. G06Q 20/16; G06Q 20/3224; G06Q 20/322; G06Q 20/401; H04W 4/02;
(Continued)

(56) References Cited

U.S. PATENT DOCUMENTS 3,416,032 A 12/1968 Jahns et al.
4,553,257 A 11/1985 Mori et al.
(Continued)

FOREIGN PATENT DOCUMENTS

GB 2430588 3/2007
GB 2430588 A1 3/2007
(Continued)

OTHER PUBLICATIONS

Jerry Gao, Ph.D., Krishnaveni Edunuru, Jacky Cai, and Simon Shim; "P2P-Paid: A Peer-to-Peer Wireless Payment System"; P2P-Paid_A_Peer-to-Peer_Wireless_Payment_System.pdf (Year: 2005).*
(Continued)

*Primary Examiner* — Mamon Obeid
*Assistant Examiner* — Edgar R Martinez-Hernandez
(74) *Attorney, Agent, or Firm* — Dergosits & Noah LLP

(57) ABSTRACT

A method includes receiving, by a payment server, a request for a payment from a mobile communication device; and, generating, a request to verify the location of the mobile communication device. In response to receiving the location of the mobile communication device, determining whether or not to authorize the requested payment.

22 Claims, 10 Drawing Sheets

(51) Int. Cl.
*H04W 4/60* (2018.01)
*H04W 4/12* (2009.01)
*H04W 4/02* (2018.01)
*H04W 4/00* (2018.01)

(52) U.S. Cl.
CPC .............. *H04W 4/60* (2018.02); *H04W 4/02* (2013.01); *H04W 4/12* (2013.01)

(58) Field of Classification Search
CPC ....... H04W 4/026; H04W 4/028; H04W 4/12; H04W 4/60; H04W 4/00; H04L 29/08693; H04L 67/26; G06F 17/30864
USPC ........................................................ 705/75
See application file for complete search history.

(56) References Cited

U.S. PATENT DOCUMENTS

| | | | |
|---|---|---|---|
| 5,319,776 A | 6/1994 | Hile et al. | |
| 5,574,775 A | 11/1996 | Miller, II et al. | |
| 5,715,518 A | 2/1998 | Barrere et al. | |
| 6,185,689 B1 | 2/2001 | Todd et al. | |
| 6,269,456 B1 | 7/2001 | Hodges et al. | |
| 6,272,353 B1 | 8/2001 | Dicker et al. | |
| 6,301,668 B1 | 10/2001 | Gleichauf et al. | |
| 6,453,345 B2 | 9/2002 | Trcka et al. | |
| 6,529,143 B2 | 3/2003 | Mikkola et al. | |
| 6,696,941 B2 | 2/2004 | Baker | |
| 6,792,543 B2 | 9/2004 | Pak et al. | |
| 6,892,225 B1 | 5/2005 | Tu et al. | |
| 6,907,530 B2 | 6/2005 | Wang | |
| 6,959,184 B1 | 10/2005 | Byers et al. | |
| 7,020,895 B2 | 3/2006 | Albrecht | |
| 7,069,589 B2 | 6/2006 | Schmall et al. | |
| 7,096,368 B2 | 8/2006 | Kouznetsov et al. | |
| 7,123,626 B1 * | 10/2006 | Feyerabend | H04L 29/06 370/466 |
| 7,123,933 B2 | 10/2006 | Poor et al. | |
| 7,127,455 B2 | 10/2006 | Carson et al. | |
| 7,159,036 B2 | 1/2007 | Hinchliffe et al. | |
| 7,159,237 B2 | 1/2007 | Schneier et al. | |
| 7,171,690 B2 | 1/2007 | Kouznetsov et al. | |
| 7,178,166 B1 | 2/2007 | Taylor et al. | |
| 7,181,252 B2 | 2/2007 | Komsi | |
| 7,210,168 B2 | 4/2007 | Hursey et al. | |
| 7,228,566 B2 | 6/2007 | Caceres et al. | |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,290,276 B2 | 10/2007 | Ogata | |
| 7,304,570 B2 | 12/2007 | Thomas et al. | |
| 7,305,245 B2 * | 12/2007 | Alizadeh-Shabdiz | G01S 5/02 455/456.6 |
| 7,308,256 B2 | 12/2007 | Morota et al. | |
| 7,308,712 B2 | 12/2007 | Banzhof | |
| 7,325,249 B2 | 1/2008 | Sutton et al. | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 | 6/2008 | Szor | |
| 7,397,424 B2 | 7/2008 | Houri | |
| 7,401,359 B2 | 7/2008 | Gartside et al. | |
| 7,403,762 B2 | 7/2008 | Morgan et al. | |
| 7,414,988 B2 | 8/2008 | Jones et al. | |
| 7,415,270 B2 | 8/2008 | Wilhelmsson et al. | |
| 7,433,694 B2 | 10/2008 | Morgan et al. | |
| 7,467,206 B2 | 12/2008 | Moore et al. | |
| 7,471,954 B2 | 12/2008 | Brachet et al. | |
| 7,472,422 B1 | 12/2008 | Agbabian | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz | |
| 7,525,541 B2 | 4/2009 | Cordero et al. | |
| 7,526,297 B1 * | 4/2009 | Holur | H04L 67/26 340/7.48 |
| 7,551,579 B2 | 6/2009 | Alizadeh-Shabdiz | |
| 7,551,929 B2 | 6/2009 | Alizadeh-Shabdiz | |
| 7,634,800 B2 | 12/2009 | Ide et al. | |
| 7,685,132 B2 | 3/2010 | Hyman | |
| 7,696,923 B2 | 4/2010 | Houri | |
| 7,768,963 B2 | 8/2010 | Alizadeh-Shabdiz | |
| 7,769,396 B2 | 8/2010 | Alizadeh-Shabdiz et al. | |
| 7,774,637 B1 | 8/2010 | Beddoe et al. | |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,813,745 B2 * | 10/2010 | Li | H04L 12/1859 370/473 |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,907,966 B1 | 3/2011 | Mammen | |
| 7,916,661 B2 | 3/2011 | Alizadeh-Shabdiz et al. | |
| 7,991,854 B2 | 8/2011 | Bahl | |
| 7,999,742 B2 | 8/2011 | Alizadeh-Shabdiz et al. | |
| 8,014,788 B2 | 9/2011 | Alizadeh-Shabdiz et al. | |
| 8,019,357 B2 | 9/2011 | Alizadeh-Shabdiz et al. | |
| 8,031,657 B2 | 10/2011 | Jones et al. | |
| 8,054,219 B2 | 11/2011 | Alizadeh-Shabdiz | |
| 8,087,082 B2 | 12/2011 | Bloch et al. | |
| 8,089,398 B2 | 1/2012 | Alizadeh-Shabdiz | |
| 8,089,399 B2 | 1/2012 | Alizadeh-Shabdiz | |
| 8,090,386 B2 | 1/2012 | Alizadeh-Shabdiz | |
| 8,099,764 B2 | 1/2012 | Herzog et al. | |
| 8,108,555 B2 | 1/2012 | Awadallah et al. | |
| 8,121,617 B1 | 2/2012 | LaGrotta et al. | |
| 8,126,456 B2 | 2/2012 | Lotter et al. | |
| 8,127,358 B1 | 2/2012 | Lee | |
| 8,135,395 B2 | 3/2012 | Cassett et al. | |
| 8,195,196 B2 | 6/2012 | Haran et al. | |
| 8,259,568 B2 | 9/2012 | Laudermilch et al. | |
| 8,261,351 B1 | 9/2012 | Thornewell et al. | |
| 8,266,288 B2 | 9/2012 | Banerjee et al. | |
| 8,266,324 B2 | 9/2012 | Baratakke et al. | |
| 8,346,860 B2 | 1/2013 | Berg et al. | |
| 8,356,080 B2 | 1/2013 | Luna et al. | |
| 8,364,785 B2 | 1/2013 | Plamondon | |
| 8,467,768 B2 * | 6/2013 | Mahaffey | H04L 41/0253 455/411 |
| 8,521,131 B1 * | 8/2013 | Ramalingam | H04W 4/029 455/410 |
| 2001/0044339 A1 | 11/2001 | Cordero et al. | |
| 2002/0042886 A1 | 4/2002 | Lahti et al. | |
| 2002/0087483 A1 | 7/2002 | Harif | |
| 2002/0108058 A1 | 8/2002 | Iwamura | |
| 2002/0183060 A1 | 12/2002 | Ko et al. | |
| 2002/0191018 A1 | 12/2002 | Broussard | |
| 2003/0028803 A1 | 2/2003 | Bunker et al. | |
| 2003/0046134 A1 | 3/2003 | Frolick et al. | |
| 2003/0079145 A1 | 4/2003 | Kouznetsov et al. | |
| 2003/0115485 A1 | 6/2003 | Milliken et al. | |
| 2003/0120951 A1 | 6/2003 | Gartside et al. | |
| 2003/0131148 A1 | 7/2003 | Kelley et al. | |
| 2004/0022258 A1 | 2/2004 | Tsukada et al. | |
| 2004/0025042 A1 | 2/2004 | Kouznetsov et al. | |
| 2004/0058644 A1 | 3/2004 | Saigo et al. | |
| 2004/0133624 A1 | 7/2004 | Park | |
| 2004/0158741 A1 | 8/2004 | Schneider | |
| 2004/0185900 A1 | 9/2004 | McElveen | |
| 2004/0199665 A1 * | 10/2004 | Omar | G06F 17/3089 709/238 |
| 2004/0209608 A1 | 10/2004 | Kouznetsov et al. | |
| 2004/0225887 A1 | 11/2004 | O'Neil et al. | |
| 2004/0259532 A1 | 12/2004 | Isomaki et al. | |
| 2005/0010821 A1 | 1/2005 | Cooper et al. | |
| 2005/0015443 A1 | 1/2005 | Levine et al. | |
| 2005/0074106 A1 | 4/2005 | Orlamunder et al. | |
| 2005/0076246 A1 | 4/2005 | Singhal | |
| 2005/0091308 A1 | 4/2005 | Bookman et al. | |

(56) References Cited

U.S. PATENT DOCUMENTS

| | | |
|---|---|---|
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0193096 A1* | 9/2005 | Yu .................... H04L 67/2847 709/219 |
| 2005/0197099 A1 | 9/2005 | Nehushtan |
| 2005/0221800 A1 | 10/2005 | Jackson et al. |
| 2005/0227669 A1 | 10/2005 | Hapamas |
| 2005/0237970 A1 | 10/2005 | Inoue |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0059253 A1* | 3/2006 | Goodman .............. G06Q 10/06 709/223 |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0085357 A1* | 4/2006 | Pizarro ................ G06Q 20/10 705/64 |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 6/2006 | D'Agostino |
| 2006/0150256 A1 | 6/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1* | 1/2007 | Casey ................... G01C 21/20 455/456.2 |
| 2007/0016953 A1 | 1/2007 | Morris et al. |
| 2007/0016955 A1 | 1/2007 | Goldberg et al. |
| 2007/0021112 A1 | 1/2007 | Bryne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0134641 A1* | 6/2007 | Lieu ...................... G09B 5/06 434/350 |
| 2007/0154014 A1 | 7/2007 | Aissi et al. |
| 2007/0174472 A1 | 7/2007 | Kulakowski |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0233615 A1* | 10/2007 | Tumminaro ............ G06Q 20/12 705/75 |
| 2007/0240127 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0297610 A1 | 10/2007 | Chen et al. |
| 2007/0293263 A1 | 12/2007 | Eslambolchi et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0196104 A1 | 8/2008 | Tuvell et al. |
| 2008/0200160 A1 | 8/2008 | Fitzpatrick et al. |
| 2008/0200168 A1* | 8/2008 | Jiang .................... H04W 48/18 455/432.1 |
| 2008/0208950 A1 | 8/2008 | Kim et al. |
| 2008/0209557 A1 | 8/2008 | Herley et al. |
| 2008/0318562 A1 | 8/2008 | Featherstone et al. |
| 2008/0228654 A1* | 9/2008 | Edge .................... G01S 19/48 705/71 |
| 2008/0235801 A1 | 9/2008 | Soderberg et al. |
| 2008/0270490 A1* | 10/2008 | Watterott .......... G06F 17/30557 |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0320497 A1* | 12/2008 | Tarkoma ............... G06F 9/4856 719/319 |
| 2009/0119375 A1* | 5/2009 | Shenfield ............... H04L 67/26 709/206 |
| 2009/0172227 A1 | 7/2009 | Taylor et al. |
| 2009/0187492 A1* | 7/2009 | Hammad ............. G06Q 10/087 705/26.1 |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0281904 A1* | 11/2009 | Pharris ................ G06Q 20/102 705/17 |
| 2009/0293125 A1 | 11/2009 | Szor |
| 2010/0019731 A1 | 1/2010 | Connolly et al. |
| 2010/0022254 A1* | 1/2010 | Ashfield ............ G06Q 20/3224 455/456.6 |
| 2010/0049615 A1* | 2/2010 | Rose .................... G06Q 20/02 705/17 |
| 2010/0064341 A1 | 3/2010 | Aldera |
| 2010/0082486 A1* | 4/2010 | Lee ....................... G06Q 20/12 705/44 |
| 2010/0097494 A1 | 4/2010 | Gum et al. |
| 2010/0100591 A1 | 4/2010 | Burgess et al. |
| 2010/0100939 A1* | 4/2010 | Mahaffey ............... G06F 21/30 726/4 |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0125509 A1* | 5/2010 | Kranzley ............... G06Q 20/20 705/17 |
| 2010/0138501 A1 | 6/2010 | Clinton et al. |
| 2010/0154032 A1 | 6/2010 | Ollmann |
| 2010/0173658 A1* | 7/2010 | Fan ...................... H04L 12/1859 455/466 |
| 2010/0210240 A1 | 8/2010 | Mahaffey et al. |
| 2010/0240419 A1 | 9/2010 | Horino |
| 2010/0299664 A1* | 11/2010 | Taylor ................... G06F 8/65 717/173 |
| 2010/0313270 A1 | 12/2010 | Kim et al. |
| 2010/0332593 A1 | 12/2010 | Barash et al. |
| 2010/0332680 A1 | 12/2010 | Anderson et al. |
| 2011/0047033 A1 | 2/2011 | Mahaffey et al. |

(56) References Cited

U.S. PATENT DOCUMENTS

| | | |
|---|---|---|
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0137804 A1* | 6/2011 | Peterson .............. G06Q 20/085 705/77 |
| 2011/0145920 A1 | 6/2011 | Burgess et al. |
| 2011/0241872 A1 | 6/2011 | Mahaffey |
| 2011/0171923 A1 | 7/2011 | Daly et al. |
| 2011/0296510 A1 | 12/2011 | Hatlelid et al. |
| 2012/0042382 A1 | 3/2012 | Mahaffey |
| 2012/0060222 A1 | 3/2012 | Burgess et al. |
| 2012/0072569 A1 | 3/2012 | Xu |
| 2012/0084864 A1 | 3/2012 | Burgess et al. |
| 2012/0084836 A1 | 4/2012 | Mahaffey et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0185398 A1* | 7/2012 | Weis ..................... G06O 20/20 705/75 |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0086682 A1 | 4/2013 | Mahaffey et al. |
| 2014/0029478 A1* | 1/2014 | Bhagavatula ....... H04L 65/1053 370/271 |
| 2015/0142868 A1* | 5/2015 | Liu ....................... H04L 51/20 709/202 |

FOREIGN PATENT DOCUMENTS

| | | |
|---|---|---|
| WO | 2007081356 | 7/2001 |
| WO | 2005101789 | 10/2005 |
| WO | W02005101789 A1 | 10/2005 |
| WO | 2006110181 | 10/2006 |
| WO | 2008007111 | 1/2008 |
| WO | W02008007111 A1 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Jesús Téllez Isaac, Sherali Zeadally; "Secure Mobile Payment Systems"; Secure_Mobile_Payment_Systenns.pdf (Year: 2014).*

PCT International Preliminary Report on Patentability for PCT/US2011/049182; dated Mar. 7, 2013; pp. 1-9.

Non-Final Office Action dated Dec. 26, 2012 for U.S. Appl. No. 13/160,382, filed Jun. 14, 2011; pp. 1-23.

Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

* cited by examiner

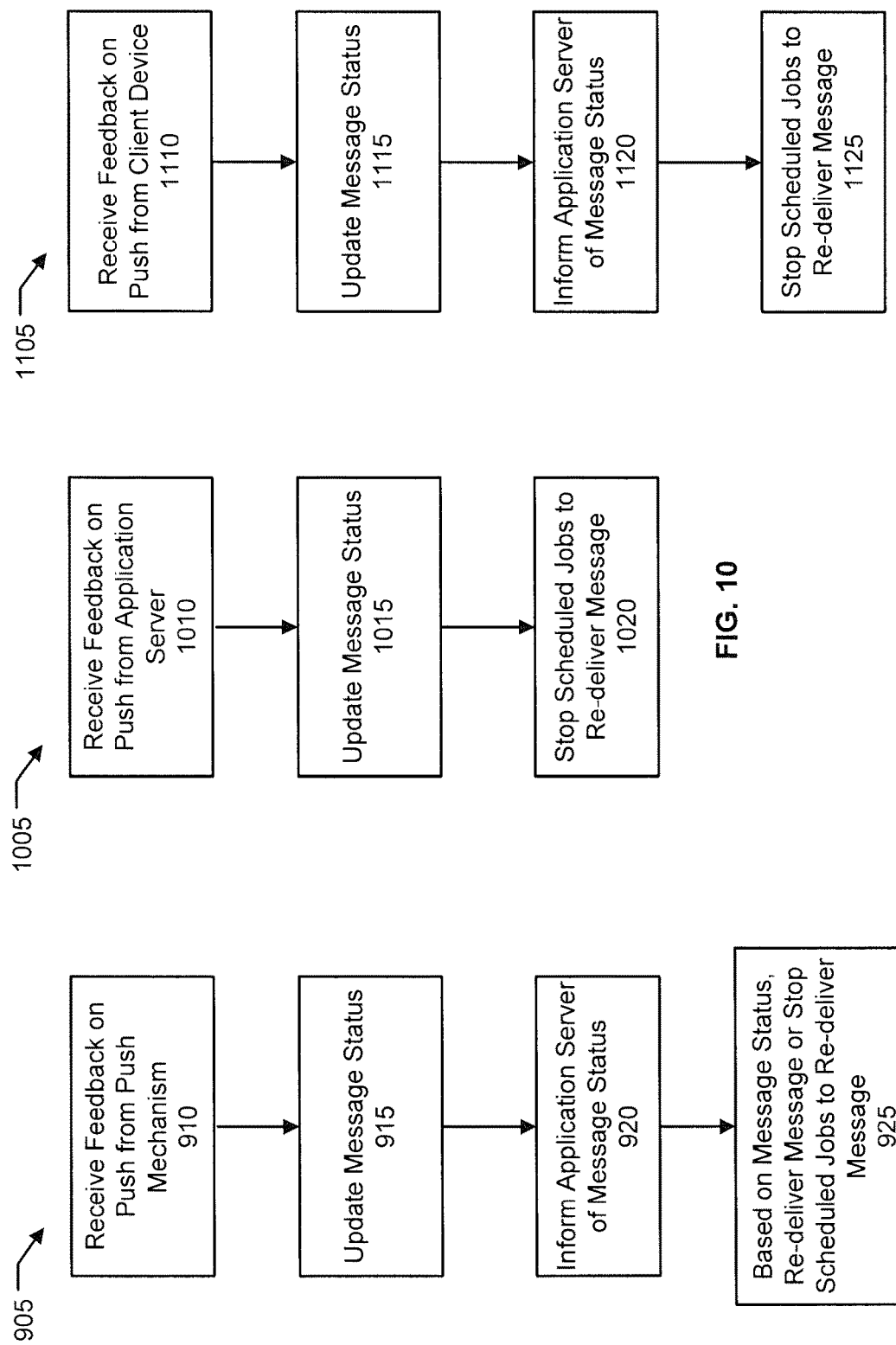

MOBILE COMMUNICATIONS DEVICE PAYMENT METHOD UTILIZING LOCATION INFORMATION

RELATED APPLICATION DATA

This application is a continuation of U.S. patent application Ser. No. 13/212,055, entitled "SYSTEM AND METHOD FOR INDICATING TO A MOBILE COMMUNICATIONS DEVICE," filed on Aug. 17, 2011, now U.S. Pat. No. 8,788,881, issued on Jul. 11, 2014, which is incorporated herein in its entirety.

TECHNICAL FIELD

This disclosure relates generally to methods and systems for utilizing location information from a mobile communications device as part of a transaction payment. The mobile communication device provides geolocation information in response to a query from a payment server. The geolocation information is used as one of the factors to determine whether the payment transaction should be authorized.

BACKGROUND OF THE INVENTION

There was a time when computers were so expensive that only businesses could afford such purchases. These computers had to be housed in large facilities and the number of available applications could perhaps be counted using single hand. Today, we live in a very different world. Computing devices can now fit on a desk or even in one's pocket, purse, or briefcase as in the case of smartphones and tablet computers. There are now millions of these computing devices in the hands of consumers, businesses, and governments.

Indeed, there has also been an explosion in the number of applications available. For example, the Android Market and Apple App Store each have over 100,000 applications available, with many more applications being added each and every day. These applications are sometimes referred to as "apps." There is a rich variety of applications. Some applications are merely for fun and entertainment. Other applications are for work. There are applications covering such diverse categories as business, games, health, recipes, shopping, sports, news, travel, and many more.

In some cases, an application developer or content provider may want to contact the computing device on which the application is installed. For example, there may be a critical software update, a new piece of information, or some other instruction or command for the device—just to name a few examples.

However, contacting the device can be daunting task for the application or content provider because there are many different factors to consider. There are dozens of different types, models, and platforms of mobile communications devices. Further, there are many different operating systems, different versions, and communication networks and carriers. In some cases, because of the complexity, the provider chooses not to contact the device or the contact fails. This may be especially unfortunate where the contact is related to a matter that is urgent such as a security concern, a large financial transaction, and so forth.

Therefore, there is a need to provide systems and techniques to facilitate contacting a mobile communications device.

BRIEF DESCRIPTION OF THE FIGURES

This disclosure is illustrated by way of example and not limitation in the figures of the accompanying drawings, in which like references indicate similar elements, and in which:

FIG. 9 shows a flow diagram where feedback on the push is received from a push mechanism.

FIG. 10 shows a flow diagram where feedback on the push is received from an application server.

FIG. 11 shows a flow diagram where feedback on the push is received from a mobile communications device.

DETAILED DESCRIPTION

Figure 1:
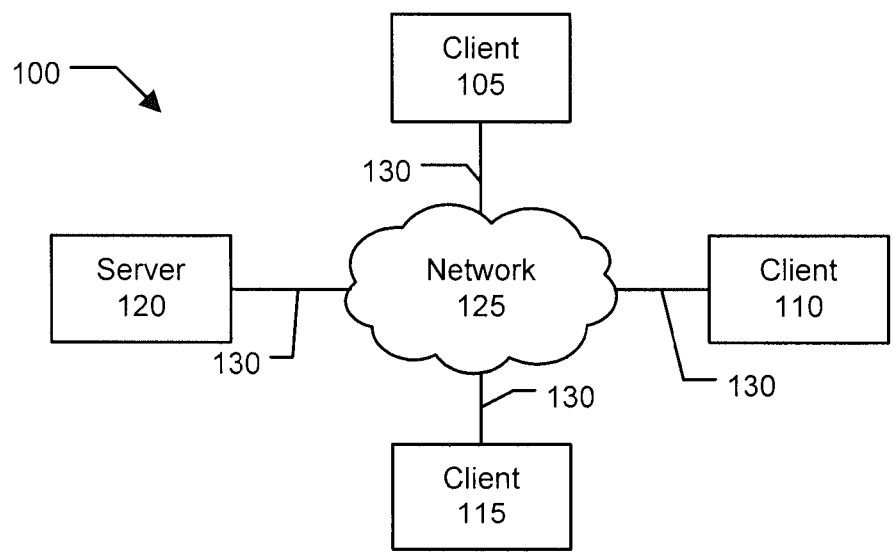
FIG. 1 shows a simplified block diagram of a distributed computing network connecting a server and devices in which a system for indicating to a mobile communications device may be implemented.

FIG. 1 is a simplified block diagram of a distributed computer network 100 incorporating an embodiment of the present invention. Computer network 100 includes a number of mobile client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 120 may be connected to communication network 125. As another example, a number of mobile client systems 105, 110, and 115 may be coupled to communication network 125 via an access provider (not shown) or via some other server system.

Mobile client systems 105, 110, and 115 typically request information from a server system which provides the information. It should be appreciated, however, that information can generally flow in both directions (e.g., a backup service primarily sends data from clients to server), but the server is the service provider. Server systems by definition typically have more computing and storage capacity than mobile client systems. However, a particular computer system may act as both a client or a server depending on whether the computer system is requesting or providing information. Aspects of the invention may be embodied using a client-server environment or a cloud-cloud computing environment.

Server 120 is responsible for receiving information requests from mobile client systems 105, 110, and 115, performing processing required to satisfy the requests, and for forwarding the results corresponding to the requests back to the requesting mobile client system. The processing required to satisfy the request may be performed by server system 120 or may alternatively be delegated to other servers connected to communication network 125.

Mobile client systems 105, 110, and 115 enable users to access and query information or applications stored by server system 120. A mobile client may be referred to as a distributed mobile client. Some example mobile client systems include but are not limited to portable electronic devices (e.g., mobile communication devices) whose principle function is voice communication including the Apple iPhone®, the Apple iPad®, the Palm Pre™, or any mobile device running the Apple iOS™, Android™ OS, Google Chrome OS, Symbian OS®, Windows Mobile® OS, Palm OS® or Palm Web OS™. In a specific embodiment, a "web browser" application executing on a mobile client system enables users to select, access, retrieve, or query information and/or applications stored by server system 120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 2:
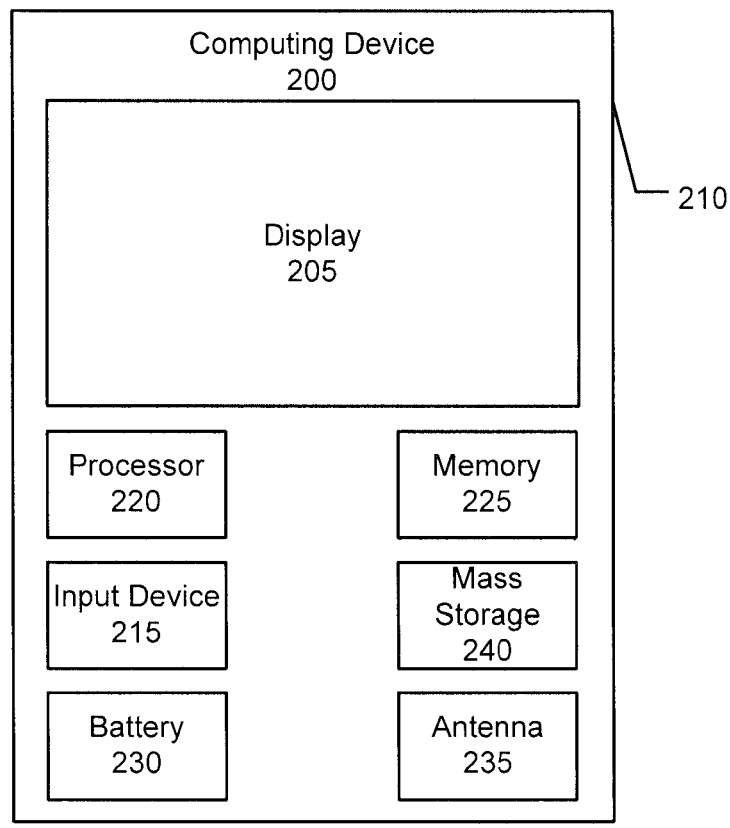
FIG. 2 shows a more detailed diagram of an exemplary mobile communications device.

FIG. 2 shows an exemplary computer system such as a mobile client system of the present invention. In an embodiment, a user interfaces with the system through a client system, such as shown in FIG. 2. Mobile client communication or portable electronic device 200 includes a display, screen, or monitor 205, housing 210, and input device 215. Housing 210 may house familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like and various combinations thereof. These components may be connected using any interconnection scheme or bus architecture.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 2 is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone or iPad, both provided by Apple, and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with an intransient computer-readable medium. An intransient computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

Figure 3:
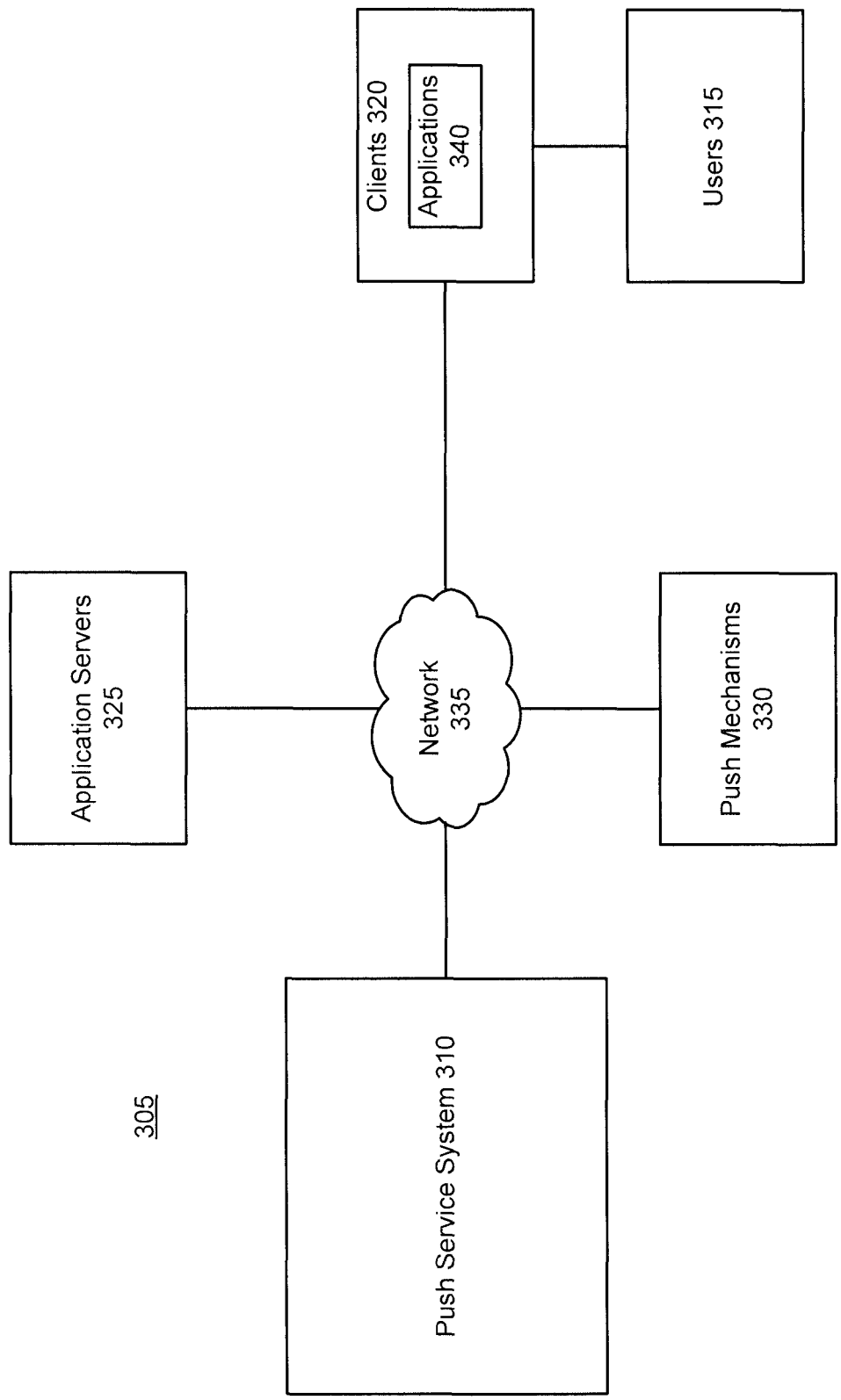
FIG. 3 shows a simplified block diagram of an environment in which a push service system may be implemented.

FIG. 3 shows a simplified block diagram of an environment 305 in which a push service system 310 may be implemented. This environment, in addition to the push service system, includes users or end-users 315 at mobile devices 320, application servers 325, and push mechanism providers 330. The push service system, mobile devices, application servers, and push mechanism providers may be connected to each other via a network 335.

Users interact with their mobile devices via application programs 340 on the devices. An application program may be referred to as an "app." Such applications are developed or provided by application developers or content providers. These applications are typically made available for the client via a marketplace such as the Android Market and Apple App Store.

There are hundreds of thousands of application programs available for the clients. For example, the Android Market and Apple App Store each have over 100,000 applications available for download, with many more applications being added each and every day. There are applications covering such diverse categories as business, education, entertainment, finance, health & fitness, news, music, shopping, sports, travel, weather, and many more.

A specific example of an application is Lookout Mobile Security, provided by Lookout Inc. of San Francisco, Calif. Lookout Mobile Security is a lightweight application designed to protect a smartphone against phishing, malware, and spyware. There are over 8 million Lookout users and the company has received awards and recognition from PCWorld, BusinessWeek, The New York Times, CNET.com, The Wall Street Journal, CNN, and many others.

Other examples of applications that may be found on a client device include browser programs (e.g., Android Browser, Dolphin Browser, Firefox Mobile, Opera Mobile, or Safari), text message (e.g., Short Message Service ("SMS") or Multimedia Messaging Service ("MMS") programs (e.g., Handcent), and map, Global Positioning System (GPS), or navigation programs (e.g., Google Maps). When the application is installed on the device, an icon to the application may be placed on the home screen or application menu of the device. The application can be accessed or launched by touching the icon on the screen.

In some cases, an application developer provides the application for free, i.e., without cost or charge to the user. Users of free applications may be referred to as a non-paying customers. In other cases, the application must be purchased by the user. There can be an initial or one-time purchase cost, a recurring cost (e.g., monthly subscription fee), or both. Users who purchase applications may be referred to as paying customers.

Push mechanism providers 330 provide services or mechanisms for application developers to send information from application servers 325 to the users and application programs on the devices. Some examples of push mechanisms include Android Cloud to Device Messaging (C2DM), Apple Push Notification Service (APNS), SMS Push, Lookout Cloudpush, BlackBerry Push Service, long poll (e.g., a persistent connection from client to server which allows the server to notify the client when needed), and others. Typically, the information includes a lightweight message (e.g., 1024 characters or less) that instructs the client application program to connect to the application server to receive further information, instructions, commands, or updates (e.g., bug fixes, patches, new e-mails, news items, social networking status updates, current weather, stock quotes and alerts, and so forth).

Push service system 310 facilitates or solves the problem of being able to push information or requests to different types of client devices from a single server. Some advantages of the push service system include: (1) providing a flexible signaling depending on the device—support for a variety of devices, (2) providing fault tolerant delivery for the application server, (3) providing a single point for analytics of various push backend mechanisms to compare their performance, and (4) allowing for loose coupling between the application server and notification mechanisms. This helps to make the application program more maintainable.

More particularly, some push mechanisms are device-specific. The Android C2DM application programming interface (API), provided by Google, allows content or application providers to push messages to Android client devices, but not to iPhone devices. Conversely, APNS, the Apple Push Notification Service provided by Apple, allows push messages to be sent to iPhone client devices, but not to Android devices.

Selecting a suitable or appropriate push mechanism can be complicated because there are many factors to consider. In addition to type of device (e.g., Android versus iPhone), different push mechanisms offer different delivery options and message handling, and different pricing options and plans. Some push mechanisms are free or without cost to the application provider or user. Other push mechanisms may require a payment for pushing the message. There can be different payment options and pricing models (e.g., message bundling or subscriptions). Options may vary depending upon country. For example, a push mechanism provider may offer free SMS messages delivered to North America, but require a payment for delivery to regions outside North America (e.g., Russia). Some push mechanisms are more reliable than other push mechanisms. Some push mechanisms provide delivery confirmations while others do not. As an example, Android C2DM makes no guarantee about the delivery of messages.

The presence of all these different factors make it very difficult for the application provider to decide and select a push mechanism. Further, an application provider may desire different push mechanisms depending upon the information to be sent to the client. For example, if an update is a critical security update the application provider may desire a highly reliable push mechanism even if the mechanism is very expensive. If however, the information is less critical, the application provider may desire a less expensive push mechanism even though that push mechanism may not be as reliable as the more expensive push mechanism.

Figure 4:
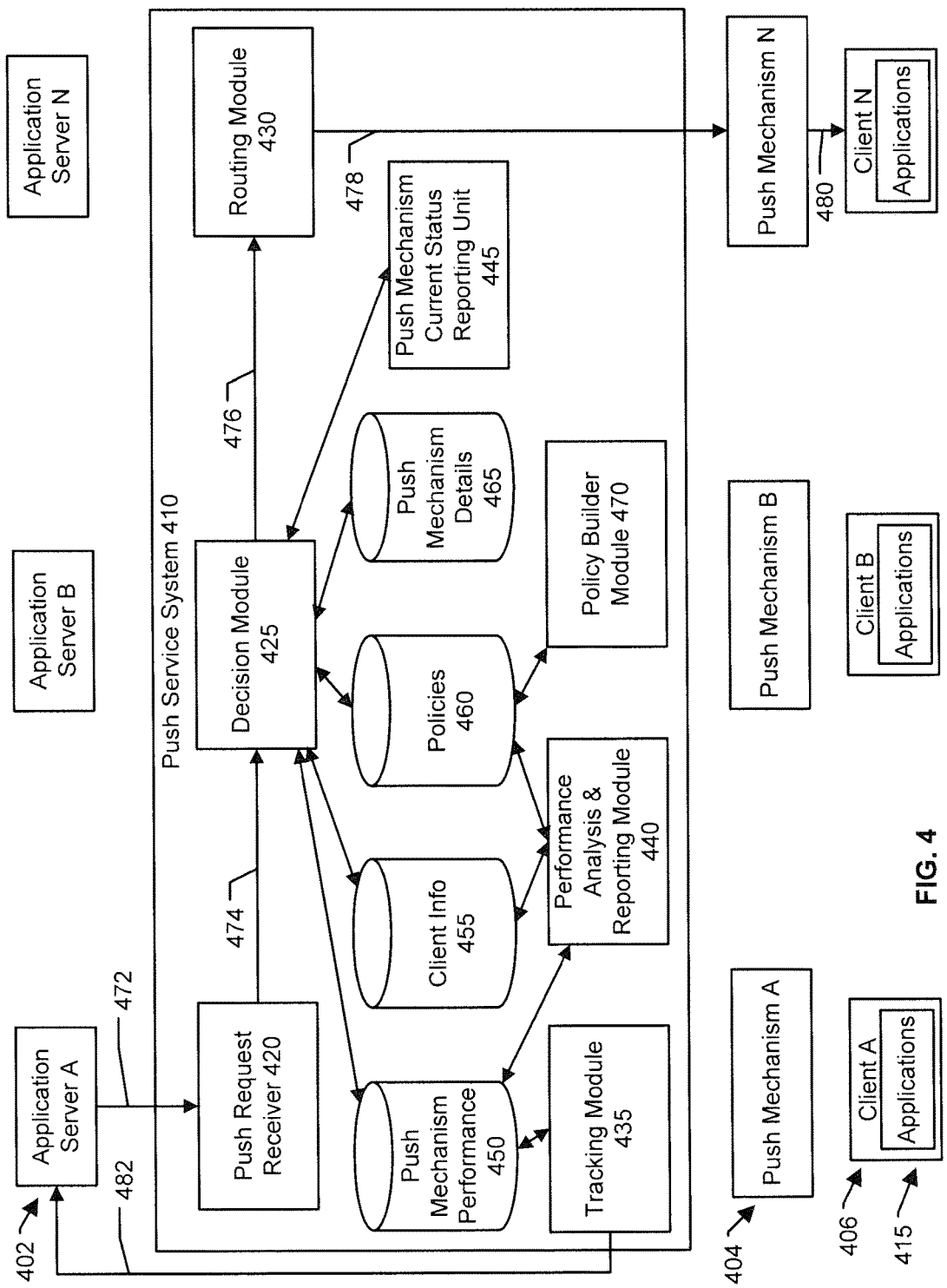
FIG. 4 shows a more detailed block diagram of the push service system.

FIG. 4 shows a more detailed block diagram of the environment shown in FIG. 3. As shown in FIG. 4, there are a set of application servers 402, a push service system 410, a set of push mechanisms or push mechanism providers or services 404, and a set of clients 406 which have application programs 415. There can be any number of clients, application servers, and push mechanisms. A client may be referred to as a distributed client.

In an embodiment, push service system 410 includes a push request receiver 420, a decision module 425, a routing module 430, a tracking or monitoring module 435, and a performance analysis and reporting module 440. The system further includes a push mechanism current status reporting unit 445, a database 450 to store push mechanism provider performance history, a database 455 to store client information, a database 460 to store policies, a database 465 to store push mechanism provider details, and a policy builder module 470. The push service system may be referred to as a push service aggregator or a push mechanism aggregator. The push service system or push service or mechanism aggregator need not contain all of the components shown in FIG. 4. Other embodiments are possible.

Figure 5:
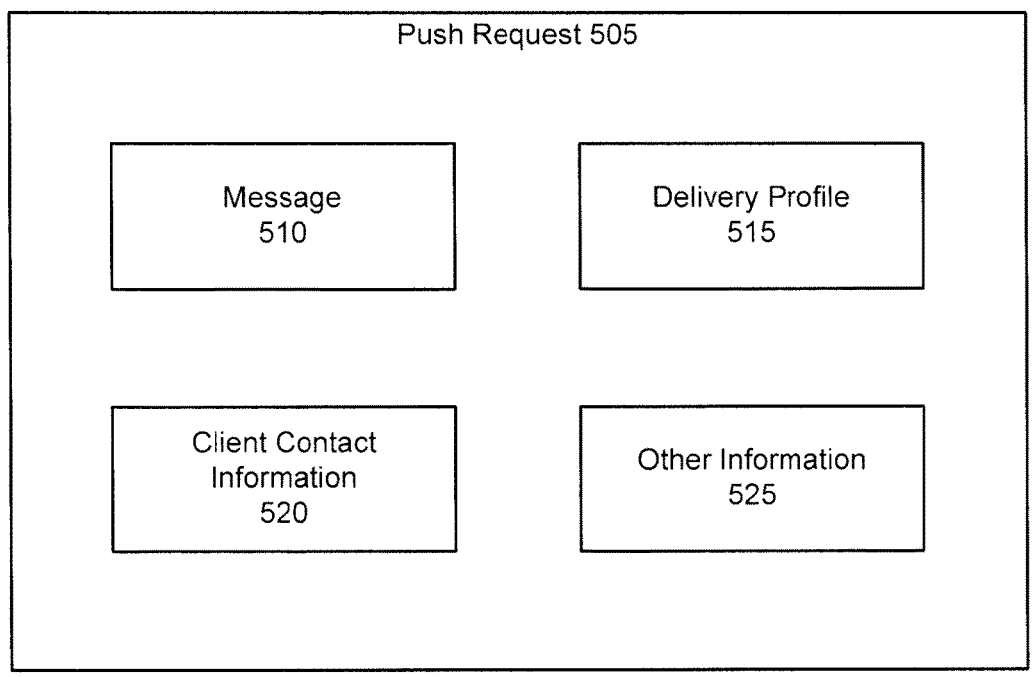
FIG. 5 shows a block diagram of a push request.

In brief, the push request receiver receives 472 a push request from an application server. The application server may be referred to as a caller of the push service. The push request may be referred to as a job request. FIG. 5 shows a block diagram of an example of a push request 505. In an embodiment, the push request may include a message 510, delivery profile 515, client contact information 520, other information 525, or combinations of these.

The message includes the information that is to be pushed to the client device. The delivery profile indicates the push delivery requirements for the message, e.g. such as cost, reliability, timing, etc. The client contact information includes information to identify the client (e.g., a phone number). Some examples of other information that may be included in the push request include a push token. In an embodiment, a push token is an alternate client contact information—analogous to a phone number over a different service. It should be appreciated that FIG. 5 is merely an example of some of the information that may be included in a push request and a push request does not necessarily include all the information shown in FIG. 5.

For example, in various specific implementations, a request includes the message and client contact information, but the push token, delivery profile, or both are omitted. In this specific implementation, the push token, delivery profile, or both may be stored on the push service system and may be identified or cross-referenced using the client contact information. In another specific implementation, a request includes the message, client contact information, and delivery profile. Further discussion of the push request including the delivery profile is provided later in this application below.

Referring now to FIG. 4, the request is forwarded 474 to the decision module. The decision module analyzes and evaluates the request to select one or more push mechanism providers from among the set of mechanisms to fulfill the request. The decision module, in making the decision, may consult one or more databases, such as the push mechanism provider history database, client information database, policy database, push mechanism provider details database, or combinations of these. The decision on which push mechanism to use is forwarded 476 to the routing module which packages, formats, and routes 478 the message to the selected push mechanism which, in turn, attempts to push 480 the message to the client. The tracking module tracks the delivery and status of the push and can report 482 to the application server that originated or initiated the push request.

In other words, in a specific implementation, an application server is communicating to clients or mobile client devices using any number of different messaging mechanisms. A mechanism (e.g., Android C2DM, Apple Push Notifications, SMS, Lookout Cloudpush) may provide different service guarantees such as reliability and latency. In this environment, there can be several types of devices, which each support a subset of the mechanisms. There can be several types of messages to be sent, which may have different requirements for service delivery. In this specific implementation, the push service provides a general device-contacting service, which allows a message to be delivered to a device via one or more configured messaging mechanisms. When the server (e.g., application server) has a message to communicate to a device, the push service can aggregate several messaging mechanisms to provide the required level of service while optimizing or balancing various parameters (e.g., minimizing or reducing cost, maximizing or improving reliability). This can be achieved by choosing an appropriate mechanism or multiple mechanisms (i.e., two or more) and additional logic such as retries or parallel delivery.

Push mechanism performance database 450 stores information about the past performance of the push mechanisms to help decision module 425 select one or more appropriate push mechanisms based on the push request. The service tracks any number of parameters to analyze performance of mechanisms. The performance information of a push mechanism can include qualitative information (e.g., "poor," "fair," "good," or "excellent"), quantitative information (e.g., numerical values, or percentage values), statistical information, quality of service (QoS) metrics, grade of service (GoS) metrics, ratings, grades, latency, ratios, key performance indicators (KPIs), or combinations of these. The information can be collected from an external source, internal source (e.g., via the tracking module), or both.

In a specific implementation, the service tracks message delivery success rates and message delivery latency. Table A below shows some of the information that may be collected in the push mechanism performance database.

TABLE A

| Push Mechanism | Success Rate (percent) | Latency (seconds) |
| --- | --- | --- |
| Android C2DM | 97.7 | 3.2 |
| APNS | 95.2 | 3.1 |
| Clickatel SMS | 89.3 | 4.3 |
| BlackBerry Push Service | 98.4 | 2.9 |
| Microsoft Push Notification Service | 94.8 | 2.8 |

Table A includes columns "Push Mechanism," "Success Rate," and "Latency." The "Push Mechanism" column lists the various push mechanisms. The "Success Rate" indicates the average success rate of the corresponding push mechanism. For example, the value of "97.7" percent for the mechanism "Android C2DM" can indicate that pushes via "Android C2DM" are successful 97.7 percent of the time. Alternatively, the success rate may be expressed as a ratio to assess the percentage of messages sent versus the percentage of messages received by the intended recipients. The "Latency" can indicate the amount of time for the mechanism to push the message to the client. For example, the value of 3.2 seconds for the mechanism "Android C2DM" can indicate that a time period of 3.2 seconds elapsed from when the push message was transmitted from the push service system to the "Android C2DM" mechanism and to the client. Such metrics may be calculated over any time period such as by quarter, month, week, day, or hour. Other metrics that may be tracked instead of or in addition to the metrics shown in Table A include data about how long it takes to detect a failure, a retry success rate, or both.

In a specific implementation, the push service system tracks the parameters as a function of location of a device (e.g., which country), connectivity of device (e.g., which network provider, operator, or carrier), device type, or combinations of these. This allows for a very detailed and granular analysis of which push mechanism would be appropriate for pushing the message to the client. For example, some push mechanisms may be more reliable in some countries than in other countries. Some network carriers may have better message delivery success rates than other network carries, and so forth.

Push mechanism provider details database 465 stores various attributes of the push mechanisms. Some examples of attributes include pricing details, whether or not delivery confirmation is provided (e.g., result notification), reliability guarantees, message size or payload limits (e.g., 8 kB payload allowed), supported push protocols (e.g., WAP PAP 2.2), supported requests (e.g., "submit push," "cancel push," "query for status," or "query for device capabilities"), submission modes (e.g., "point-to-point" for submitting a push to a single client, "multicast" for submitting a push to a list of clients, or "broadcast" for submitting a push to all clients for a registered application), expiry time (e.g., length of time push mechanism will store push requests), quality of service options (e.g., "message reached application," "message reached port on device," or no acknowledgements ("fire and forget")), and so forth.

Client information database 455 stores information about the various clients or users that may be pushed messages via one or more of the push mechanism providers. In other words, in a specific implementation, client information is persistently stored on the push service system. Table B below shows some of the information that may be collected in the client information database.

TABLE B

| Client Identification (ID) | Device Type or Model | Operating System | Carrier |
| --- | --- | --- | --- |
| 8675309 | Nexus One | Android | Sprint |
| 7410143 | iPhone | iOS | AT&T |
| 9438822 | iPhone | iOS | Verizon |
| 6829843 | Nokia X6 | Symbian | T-Mobile |
| 7251096 | BlackBerry Torch | BlackBerry OS | Verizon |

This Table includes columns for client ID, device type, operating system, and carrier. The client ID is a code to help identify the particular client (or application on the client) that is to receive the push. The client ID may include, for example, a phone number associated with the client (e.g., mobile device telephone number). The ID may be referred to as personal identification number ("PIN") or registration ID. The ID may include letters, numbers, or alphanumeric characters. The device type column can help to identify the device model. The operating system column lists the operating system on the device. The carrier column indicates the provided carrier. Other information that may collected in the client information database instead of or in addition to what is shown in Table B include a push token (e.g., mechanism specific token such as a C2DM token), device token, authentication token, application key, operating system key, client device platform version, push notification ID, user information (e.g., user's first and last name, street address, city, state, zip code, country, or e-mail), codes identifying the country, network, or both that the mobile device is usually or most recently connected to, a time and date of the last connection, or combinations of these. The client information may be referred to as profile information.

Storing such client information on the push service system can help to relieve the burden on the application server (or application developer) to store the information. Another benefit is that the push request from the application server can be kept lightweight which helps to reduce network traffic and congestion. For example, the push request may simply specify the client device or user to be contacted and the push service system can cross-reference the information in the push request with the client information database to retrieve any other additional information that may be desired. Alternatively, in another specific information, the push request includes further client details such as the push token and device type. In a specific implementation, a push request includes at least a delivery profile.

In a specific implementation, the client information is gathered from the application developer (or from the application server). For example, in some cases, when a user installs an application on the client (e.g., Google Android device), the application registers with a push mechanism (e.g., Google C2DM service) so that push messages can be received at the client. The push mechanism responds with a registration ID that represents a specific client. The application forwards the registration ID to the application server. When the application server wishes to send a push message to the specific client, that specific client can be identified via the registration ID. In this specific implementation, the registration ID is included as client information gathered from the application developer. The client information gathered from the application developer (or application server of the application developer) may be gathered when the application developer registers with the push service system.

In another specific implementation, the application developer or application server does not register with the push service for a device. Rather, the application server merely sends the request to push with all of the relevant information. In this specific implementation, the push service does not need to know/remember about clients that do not have a live push request, although information may be cached about them.

Push mechanism current status reporting unit 445 provides status updates to the decision module. Such status updates may be real-time status updates and can indicate whether there are any issues or problems with a push mechanism. That is, in a specific implementation, the push service keeps track of the status of each mechanism provider, such as current response latencies and whether the service is down so that this data can be used to optimally or efficiently use the mechanisms given their current status and past performance. The current status reporting unit can provide information as to whether the mechanism is operating or is online, is down or offline, is experiencing heavy traffic, and so forth. Such status updates may be obtained by querying or polling the push mechanism. In a specific implementation, a status update is obtained by analyzing the performance of pushes sent through the mechanism. In this specific implementation, the analysis includes having the application server confirm delivery when a device connects (round trip). This may be referred to as an out-of-band (OOB) mechanism or technique. The out-of-band technique can use a full round trip response from the application server to confirm receipt of the push.

Policies database 460 stores policies that determine the routing of a push request. In a specific implementation, delivery is according to configurable policies. That is, the policies are configurable such as by an administrator of the push service system. The routing of a push request to one or more particular push mechanisms may be chosen based on required reliability for a message, cost that the application server (or content provider) is willing to pay, type of device and available mechanisms, current status of back-end mechanism (e.g., if a mechanism is down or behaving poorly, another mechanism may be chosen), or combinations of these.

Policy builder module 470 provides an interface to policies stored in policies database 460. In a specific implementation, policy builder module includes a graphical user interface (GUI) for creating, defining, authoring, editing, or altering policies. This allows an administrator to easily add new policies or modify existing policies. In this specific implementation, the push service system includes a graphical user interface (GUI) for displaying a list of policies. The administrator can select a policy from the list of policies to edit the policy. Editing a policy may include changing an existing policy statement, adding a new statement, replacing an existing statement with a new statement, deleting an existing statement, or combinations of these. There can be a policy builder tool having a drag-and-drop interface that allows administers to create and edit policies by dragging and dropping policy objects or components on a policy configuration window provided by the GUI. In another specific implementation, the interface is embodied in code.

Tracking module 435 tracks the status of the push message transmitted to the push mechanisms. For example, when the push service tries to perform a message delivery using a particular mechanism, the push service may receive an immediate failure result from the mechanism or a pending result. This response is tracked by the tracking module which may then update the push mechanism performance history database. While the message delivery is in progress, the originating application server can query the push service (e.g., tracking module) for the current status; or the originating application server may wait for a callback response from the push service.

More particularly, a mechanism may provide synchronous feedback to the push service in response to a request, in which case the push service can immediately update the message state. A mechanism may provide asynchronous feedback via callback or other means when the message delivery status changes; in this case, the push service can update the message state. Any time the message state changes, the push service may perform a callback to inform the application server that the message state has changed. A mechanism may not provide definitive confirmation that a message has been delivered. In this case one way or approach for the push service to determine that a message was actually delivered is via out-of-bound means.

In a specific implementation, performance analysis and reporting module 440 provides an interface to query details of the performance of the push mechanisms. The information can be used for tuning or adjustment of policies, audit of the backend mechanisms, or both. A report may include a trend analysis to show the direction in which the various mechanisms are trending. The report can include graphs and charts (e.g., line chart, bar chart, or pie chart).

Figure 6:
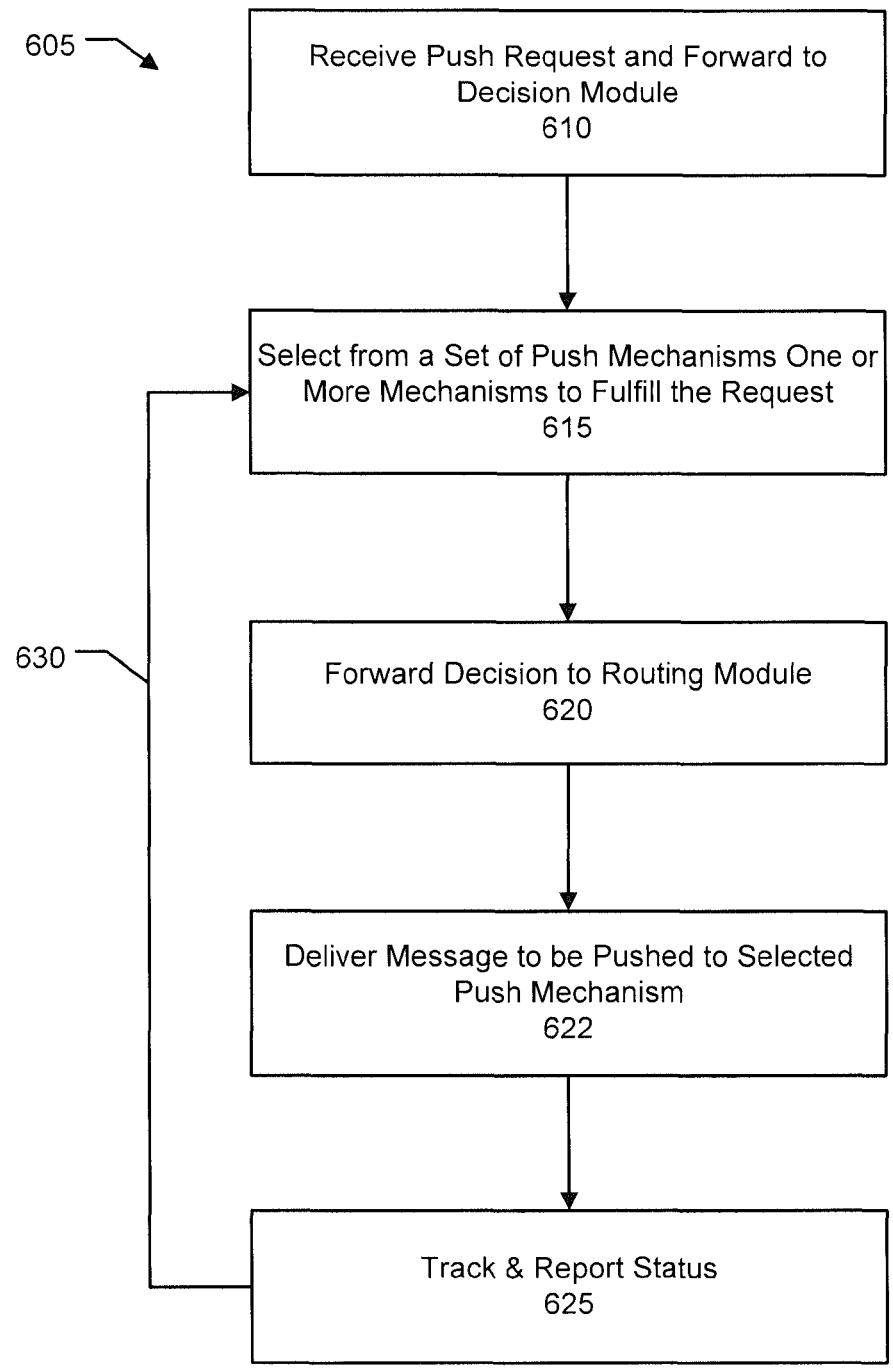
FIG. 6 shows an overall flow diagram for selecting one or more push mechanisms to push a message to a mobile communications device.

FIG. 6 shows an overall flow 605 of a specific implementation of the system. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 610 the push service system receives a push request from an application server and forwards the request to the decision module. Receiving the request by the push service may be referred to as posting a message send request to the push service. The push request may include a message, prioritization criteria, and information about the client device to receive the message. In a specific implementation, the push request includes the message to be pushed to the client device and a delivery profile. The delivery profile may be referred to as a symbolic delivery profile or a service requirement profile.

The profile can include one or more attributes or parameters to indicate the message delivery requirements or message delivery constraints. For example, the profile can include information such as reliability and latency required, cost willing to pay to deliver the message, or combinations of these. Table C below lists some examples of attributes and provides a corresponding description for each attribute.

TABLE C

| Attribute | Description |
| --- | --- |
| minimize_cost | Instructs the push service system to prioritize cost when selecting a push mechanism (e.g., select a push mechanism having the lowest cost). |
| minimize_latency | Instructs the push service system to prioritize delivery time when selecting a push mechanism. |
| maximize_reliability or critical | Instructs the push service system to prioritize reliability when selecting a push mechanism. |
| cost | Cost, such as a dollar figure or value (e.g., $0.03 or 3 cents) that the application developer is willing to pay to have the message pushed to the client device. |
| deliver_within | Specifies a time period (e.g., 4 hours) within which the message should be delivered by. Alternatively, an attribute may specify a time and date at which the message should have been pushed to the client device. |
| free | Instructs the push service system to select a free push mechanism. If no free push mechanism is available, the system may wait until a free mechanism is available and then deliver the message to the free mechanism. If multiple free mechanisms are available, the system may select more than one of the free mechanisms to help ensure that the message is pushed. |
| security_high or encrypt | Instructs the push service system to select a push mechanism that uses high security measures when pushing a message to a device (e.g., encryption). Such a delivery constraint may prevent an SMS push mechanism from being selected because such mechanisms typically do not encrypt push messages. |
| priority | Indicates the priority level of the message to be pushed (e.g., high, medium, or low). |
| customer_type | Indicates whether the user who is to receive the push message is a paying customer or a non-paying customer. |
| preferential_customer | Indicates whether the user who is to receive the push message is a preferential customer or non-preferential customer. |
| retry strategy | Specifies the activities to be performed if the selected push mechanism fails to push the message to the client device. |

One or more of these attributes may be referred to as prioritization criteria (e.g., prioritize speed or prioritize low cost). Any of the attributes listed in Table C above may instead be stored in client information database 455 of the push service system rather than being specified in the delivery profile of the push request. The system can correlate other information in the push request, such as client contact information, to determine, for example, whether the customer is a paying or non-paying customer. The determination may include cross-referencing one or more other tables of the system. Specifically, there can be an application provider table that stores profile information of each of the application providers. The application provider profile information can indicate push preferences of the corresponding application providers.

For example, the profile information for an application provider may specify that non-paying customers are only to be serviced by (i.e., receive push messages from) push mechanisms that are without charge, whereas paying customers may receive push messages from push mechanisms that charge for the pushes. The push request may specify the client contact information and client application that is to receive the push message. The system may then correlate the client contact information and client application with the client information table and application provider table to determine whether the client user is a paying customer of the application or a non-paying customer of the application.

In a specific implementation, the delivery profile includes a single attribute. For example, there can be a "no-cost" delivery profile to indicate that free push mechanisms are to be selected and push mechanisms which charge for pushes are not to be selected. In other words, the profile may simply be a name of a profile which is used to reference another set of parameters or push mechanism selection criteria. The delivery profile may be a name of a previously stored delivery profile. Other examples of a profile include a reliable least-cost delivery profile which can indicate that the least expensive push mechanism that is generally reliable (e.g., has a "fair" reliability rating) should be selected.

In another specific implementation, the delivery profile includes multiple attributes (e.g., two or more attributes). Multiple attributes may be ranked such as from most important to least important. This allows the application developer to indicate those attributes that the developer considers most important for the push service system to consider. For example, the application provider may indicate in the delivery profile that "cost" of the push mechanism is the most important attribute followed by "reliability." Alternatively, the delivery profile may indicate that "reliability" is the most important attribute followed by "cost."

In a specific implementation, the request includes the type of device being contacted, such as whether the device is an Android or iPhone device, contact information for available mechanisms (e.g., phone number, Apple push notification ID, Android C2DM token, Lookout cloudpush ID), or both. In another specific implementation, the request includes contact information for the client device (e.g., phone number), but the request does not include the device type. Rather, in this specific implementation, the system identifies the type of device by correlating the device contact information with the device type information that is stored in the client information database.

After receiving the message to be pushed, the push service may respond with an identifier (e.g., a unique identifier) for the message so the application server can reference this message in the future. That is, in response to the server push request, the push service system may respond to the server with a unique push identifier for the received push request. In this specific implementation, the push service exposes a messaging application programming interface (API) to be used by the one or more application servers. The API provides an ID that uniquely identifies a message from an application server to a specific device. In this specific implementation, this unique ID is generated when the message is posted to the push service and returned to the application server.

Figure 7:
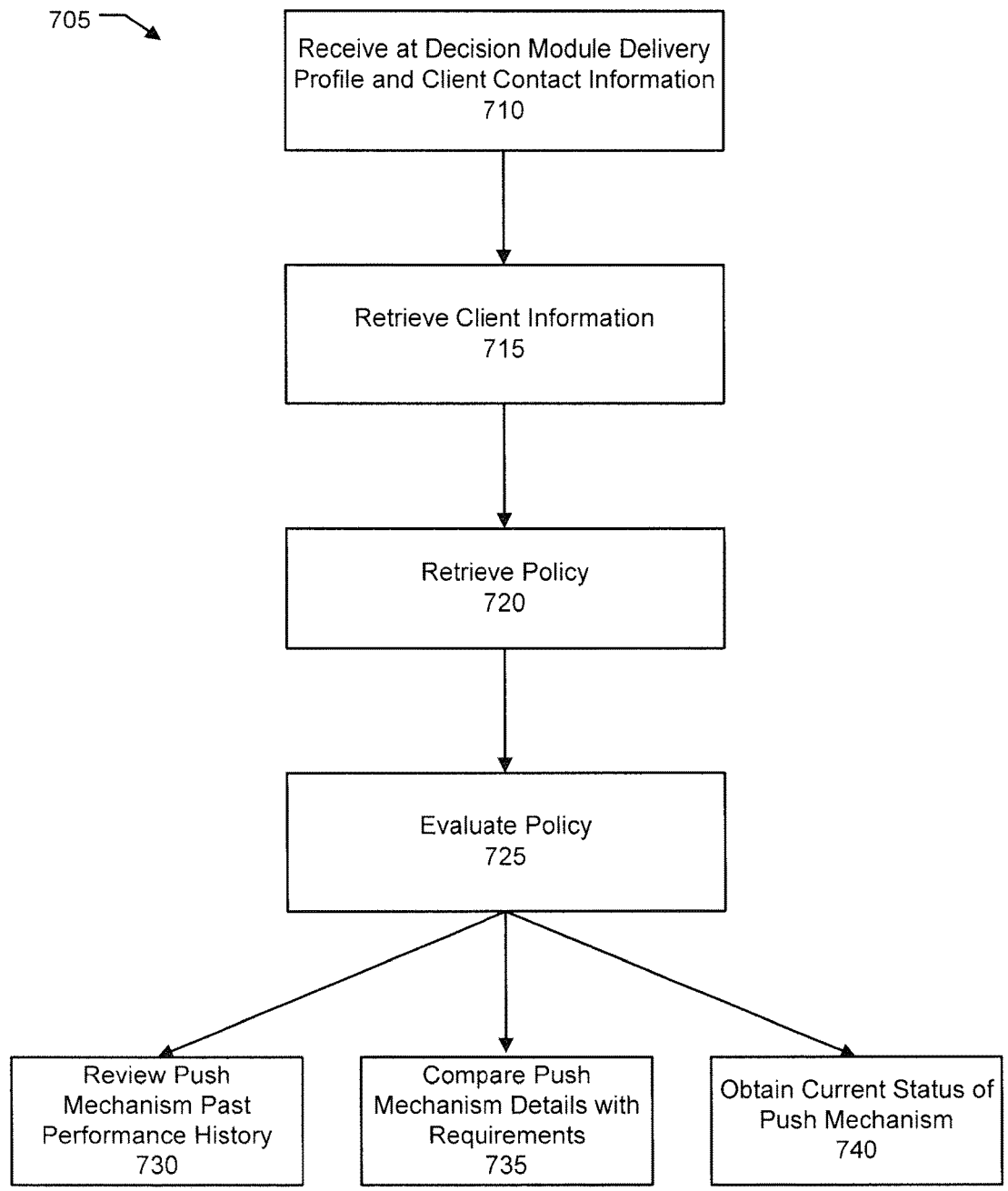
FIG. 7 shows a more detailed flow diagram for selecting the one or more push mechanisms.

In a step 615, the decision module selects or chooses from among a set of push mechanisms (e.g., two or more push mechanisms) one or more push mechanisms to fulfill the push request. FIG. 7 shows a flow 705 of substeps of a specific implementation of selecting one or more push mechanisms to push the message to the client device. As shown in FIG. 7, in a step 710 the decision module receives the push request which in a specific implementation includes the message, delivery profile, and client contact information. In a step 715, the decision module fetches the client information stored in client information database 455 (FIG. 4) by cross-referencing the client contact information.

In a step 720, the decision module fetches one or more policies stored in policies database 460 (FIG. 4). Which policy to fetch may be based on information in the delivery profile, client contact information, client information, or combinations of these. In a specific implementation, selection of a policy is based on an attribute in the delivery profile. That is, the delivery profile includes a specific attribute and a corresponding policy is selected based on the specific attribute. For example, when the delivery profile includes an attribute to "minimize_cost," the decision module selects a corresponding "minimize cost" policy.

A policy may be tagged with a label or other metadata so that the corresponding policy can be selected by matching the delivery profile attribute with the label. There can be a default policy which can be evaluated if a policy corresponding to the delivery profile attribute cannot be found.

In a step 725, the decision module evaluates the policy so that the message to be pushed can be routed to one or more appropriate push mechanisms. In a specific implementation, a policy includes directions, instructions, logic, rules, or protocols on how the decision module should select one or more push mechanisms. The policy can include one or more statements, clauses, conditional statements, expressions, threshold values, variables, operators such as comparison or relational operators, logical operators, arithmetic operators, or combinations of these. Examples of relational operators include "=" (equal to), "!=" (not equal to), ">" (greater than), "<" (less than), ">=" (greater than or equal to), and "<=" (less than or equal to). Examples of logical operators include "NOT," "AND," and "OR." Examples of arithmetic operators include "+" (addition), "−" (subtraction), "*" (multiplication), and "/" (division).

As shown in FIG. 7, evaluation of a policy may include reviewing the performance history of a push mechanism (step 730), comparing the push mechanism details with any requirements specified in the policy, delivery profile, or both (step 735), obtaining the current status of a push mechanism (step 740), or combinations of these. As described in the discussion accompanying FIG. 4, push mechanism performance history is stored in database 450, push mechanism details are stored in database 465, and the current status of a push mechanism may be obtained from push mechanism current status reporting unit 445.

Below are some examples of policies (stored in policy database 460) that may be evaluated by the decision module when deciding which push mechanism (or mechanisms) to select. The policies are written using pseudo code to help understand the principles, operation, and aspects of the policies and policy evaluation in connection with selecting a push mechanism. It should be appreciated that a policy may be written using any language, syntax, or format (e.g., Extensible Markup Language (XML) format).

---

Policy 1
SELECT push_mechanism WHERE push_mechanism.cost = 0.00

---

In the example above, "policy 1" may be selected when the delivery profile includes the attribute "minimize_cost." This policy includes a statement "push_mechanism. cost=0.00." The statement includes a variable, i.e., "push_mechanism.cost" which indicates the cost to use the push mechanism and a value, i.e., "0.00" for the variable. This policy instructs the decision module to select a push mechanism where the cost for pushing a message is "0.00," i.e., the mechanism is free or is without cost. Details of the push mechanism, such as any associated costs for pushing a message, may be stored in push mechanism provider details database 465. This policy shows an example of comparing push mechanism details with requirements specified in a policy (step 735, FIG. 7).

A policy may include multiple expressions to be evaluated:

---

Policy 2
SELECT push_mechanism WHERE push_mechanism.cost = 0.00
AND push_mechanism.status = "active"

---

In the example above, "policy 2" includes a first expression, i.e., "push_mechanism.cost=0.00" and a second expression, i.e., "push_mechanism.status='active.'" This policy instructs the decision module to select a push mechanism where both expressions evaluate to "true," i.e., the cost for pushing a message is "0.00" and the current status of the push mechanism is "active." The current status of the push mechanism may be obtained from push mechanism current status reporting unit 445 (FIG. 4).

In another specific implementation, a push mechanism may be selected even if the current status of the push mechanism is not operating, inactive, non-active, or down. For example:

---

Policy 3
SELECT push_mechanism WHERE push_mechanism.cost = 0.00
IF (push_mechanism.status = "active" AND push_mechanism.cost = 0.00) = FALSE, THEN WAIT

---

This example of a policy may result in the selection of a push mechanism even if the push mechanism is currently down, as long as there is no cost to push the message, i.e., the push mechanism is free. In this specific implementation, if there is no free mechanism available the system waits for a free mechanism to become available and then transmits the message to be pushed to the free mechanism. For example, if there is no free mechanism available, the system may place the message in a queue and upon determining that a free mechanism is available, the system can remove the message from the queue and transmit the message to the available free mechanism. Such a policy may be used in cases where the delivery profile indicates that the message to be pushed is non-critical and that a free push mechanism should be used. In a specific implementation, the system waits indefinitely for a free mechanism to become available. In another specific implementation, the system waits for a specified period of time for a free mechanism to become available. If the time expires and a free mechanism is still not available, the system may select a mechanism that charges for pushes or the system may return a notification to the originating application server indicating that the push has failed because there are no free mechanisms available.

---

Policy 4
SELECT push_mechanism WHERE push_mechanism.cost <= delivery_profile.maxium_cost

---

In the example above, "policy 4" includes the variable "delivery_profile.maxium_cost" where the value may be specified in the delivery profile. This value indicates the cost that the application server is willing to pay to have the message pushed to the client device. This policy instructs the decision module to select a push mechanism where the cost for pushing the message is less than or equal to the maximum cost as specified in the delivery profile.

```
Policy 5
SELECT push_mechanism WHERE push_mechanism.reliability = "excellent"
IF push=fail THEN WAIT 1 minute AND RETRY push_mechanism
```

In the example above, "policy 5" includes the variable "push_mechanism.reliability" which indicates the required reliability of the push mechanism. As shown in the policy example, the push mechanism should have a reliability rating of "excellent" as provided in push mechanism performance history database 450 (FIG. 4). The policy further includes a conditional statement indicating that if the push fails, the system should wait a period of time (e.g., 1 minute) and after the period of time has elapsed, send another request to the same push mechanism for the push mechanism to retry the push. This policy shows an example of reviewing push mechanism performance history (step 730, FIG. 7).

In a specific implementation, push service system 410 implements a more complex retry, such as an exponential back-off, which may or may not be specified in the policy. Further details of the exponential back-off are provided later in this application.

```
Policy 6
SELECT first_push_mechanism WHERE
first_push_mechanism.reliability = "excellent"
IF push = fail THEN SELECT second_push_mechanism WHERE
second_push_mechanism.reliability = "excellent"
```

In the example above, "policy 6" is similar to "policy 5." However, "policy 6" includes a different conditional statement for a failed push. The conditional statement indicates that if the push fails, the system should select a different push mechanism (i.e., a second push mechanism) which also has a reliability rating of "excellent" to attempt the push to the client device. Policies 5 and 6 are examples of a policy that may be selected where the delivery profile includes the attribute "maximize_reliability."

```
Policy 7
SELECT push_mechanism WHERE push_mechanism.latency = "lowest"
```

In the example above, "policy 7" specifies that the push mechanism having the "lowest" latency should be selected. The decision module can compare latency times associated with each of the push mechanisms and select that push mechanism having the lowest latency time to push the message. "Policy 7" is an example of a policy that may be selected where the delivery profile includes the attribute "minimize_latency."

```
Policy 8
SELECT first_push_mechanism WHERE
first_push_mechanism.reliability = "excellent"
AND SELECT second_push_mechanism WHERE
second_push_mechanism.reliability = "excellent"
```

In the example above, "policy 8" specifies that more than one push mechanism (e.g., two push mechanisms) should be selected to push the message to the client device. This is an example of parallel delivery. That is, in this specific implementation, the push service chooses a plurality of delivery mechanisms (i.e., two or more mechanisms). "Policy 8" is an example of a policy that may be selected where the delivery profile includes the attribute "critical."

As an example, there may be a critical security update that the application server should provide to the application on the client. As another example, the client (e.g., smartphone) may have been stolen by a thief or misplaced by the user and the application server needs to instruct a security application on the client to delete or wipe out all data on the client, sound an alarm, transmit location information, lock the smartphone, or combinations of these. Details of such a security application are described in U.S. patent application Ser. No. 12/372,719, filed Feb. 17, 2009, which is hereby incorporated in full by this reference along with all other references cited herein. As another example, an application server associated with a financial application on the client may have a very important update or alert for the user, such as information on a margin call.

Having multiple push mechanisms attempt to push the message to the client helps to ensure that the client receives at least one of the pushes. For example, if one of the first or second push mechanisms fails to push the message then another of the first or second push mechanisms may be able to push the message. In other words, while one push mechanism may fail, it is less likely that both push mechanisms will fail.

In a specific implementation of multiple push mechanisms (or push service mechanisms) in parallel, a method includes selecting first and second push mechanisms to push a message to a client and delivering the message send request to the first and second push mechanisms. The message send request may be delivered to the second push mechanism before a response is received from the first push mechanism. The message send request may be delivered to the second push mechanism before or after a push pending response is received from the first push mechanism. If, for example, the push service system receives an indication of a successful push by one of the first or second push mechanisms, the push service system may cancel, abort, or otherwise stop the other of the first or second push mechanisms (or any other remaining chosen mechanism) from pushing the message to the client. This helps to ensure that the client does not receive multiple push messages and can help to reduce network traffic.

```
Policy 9
IF CUSTOMER_TYPE = "paying" THEN SELECT push_mechanism
WHERE push_mechanism.reliability = "excellent"
ELSE IF CUSTOMER_TYPE = "non-paying" THEN SELECT
push_mechanism WHERE push_mechanism.reliabilty = "good" AND
push_mechanism.cost = "0.00"
```

"Policy 9" above shows an example of differing levels of service being provided based on whether the customer (e.g., user of the client device) is a paying customer or a non-paying customer. In this example, a paying customer of an application program receives preferential service by the push service system selecting a push mechanism having a reliability of "excellent." Using such a push mechanism may result in a charge for the push by the selected push mechanism. The charge may be assessed against the push service system which may pass the charge along to the application provider. If the customer is a non-paying customer the push service system selects a push mechanism that has a some-what less desirable reliability rating, but where the cost for using the push mechanism is without charge.

A policy may include simple rules for selecting a push mechanism based upon a single criteria such as the cost to push a message. Alternatively, there can be more powerful policies having multiple criteria for the decision module to consider, decision trees having multiple paths (e.g., "yes" and "no" paths), multiple decisions, multiple loops, complex conditional statements, nested statements, various lookups, and so forth. When there are multiple criteria, requirements, attributes, or factors to consider, such elements may be weighted according to a weighting algorithm or formula.

For example, a first push mechanism may be associated with a first attribute specifying a success rate of the first push mechanism, and a second attribute specifying a latency of the first push mechanism. A second push mechanism may be associated with a third attribute specifying a success rate of the second push mechanism, and a fourth attribute specifying a latency of the second push mechanism. In this specific implementation, the decision module uses the weighting algorithm to weight the first, second, third, and fourth attributes based on, for example, information in the message send request delivery profile. If the profile information indicates that success rate has a higher priority or is more important than latency, then the first and third attributes that specify success rates may be weighted more heavily than the second and fourth attributes that specify latency. Thus, in some cases, the first push mechanism is selected. In other cases, the second push mechanism is selected.

A policy may include a reference to another policy. A policy may also include a retry strategy. Alternatively, a retry strategy may be specified in the delivery profile. A retry strategy can specify the procedures or actions to be performed when a chosen push mechanism fails to push the message to the client device. For example, the retry strategy can specify criteria for selecting a next push mechanism such as the reliability rating for the next push mechanism, whether multiple push mechanisms should be selected for parallel pushes, timing requirements, and so forth. Specifying the retry strategy in the policy removes the responsibility from the application developer of having to detail the actions to be performed if a push fails. Some developers, however, may desire to have more control over the actions. So, a feature of the push service system is its flexibility in allowing the retry strategy to be specified by the application developer in the send request delivery profile.

It should be appreciated that an implementation of the push service system allows for retry strategies to be specified in both delivery profiles and policies. Thus, application developers who desire more control may specify the retry strategy in the delivery profile. Other application developers may desire to offload the implementation details by relying on a retry strategy as specified in the policy. If the retry strategy is specified in both the delivery profile and policy, in a specific implementation, the push service system defers to the application developer by defaulting to using the retry strategy as specified in the delivery profile. That is, the delivery profile retry strategy overrides the policy retry strategy. In another specific message send request implementation, the policy retry strategy overrides the delivery profile retry strategy.

Referring now to FIG. 6, after the decision module selects one or more push mechanisms based on the message send request delivery profile and policy, in a step 620 the decision module forwards the decision to routing module 430 (FIG. 4). In a step 622, the routing module packages and delivers or transmits the message to be pushed to the selected push mechanism. In a specific implementation, delivery work is done as a job. Each push mechanism may have different requirements or protocols for what a request to push a message must include. In other words, different push mechanisms may have different contact information (e.g., phone number for SMS versus push token for a service). The protocol in general will be a specific API for any provider. The routing module can package the push message as appropriate so that the message can be properly received by the push mechanism.

As a specific example, if the delivery profile indicates that the message should be encrypted, the routing module can encrypt the message before delivering the message to the selected push mechanism. That is, the message may be in an unencrypted format and the routing module can encrypt the message into an encrypted format.

In a step 625, tracking module 435 (FIG. 4) tracks, monitors, and reports on the status of the delivery. If there is an indication of a failed push, in some cases the system may request that the previously selected push mechanism retry the push, select another push mechanism by repeating the push mechanism selection process (as indicated by line 630), or both.

Figure 8:
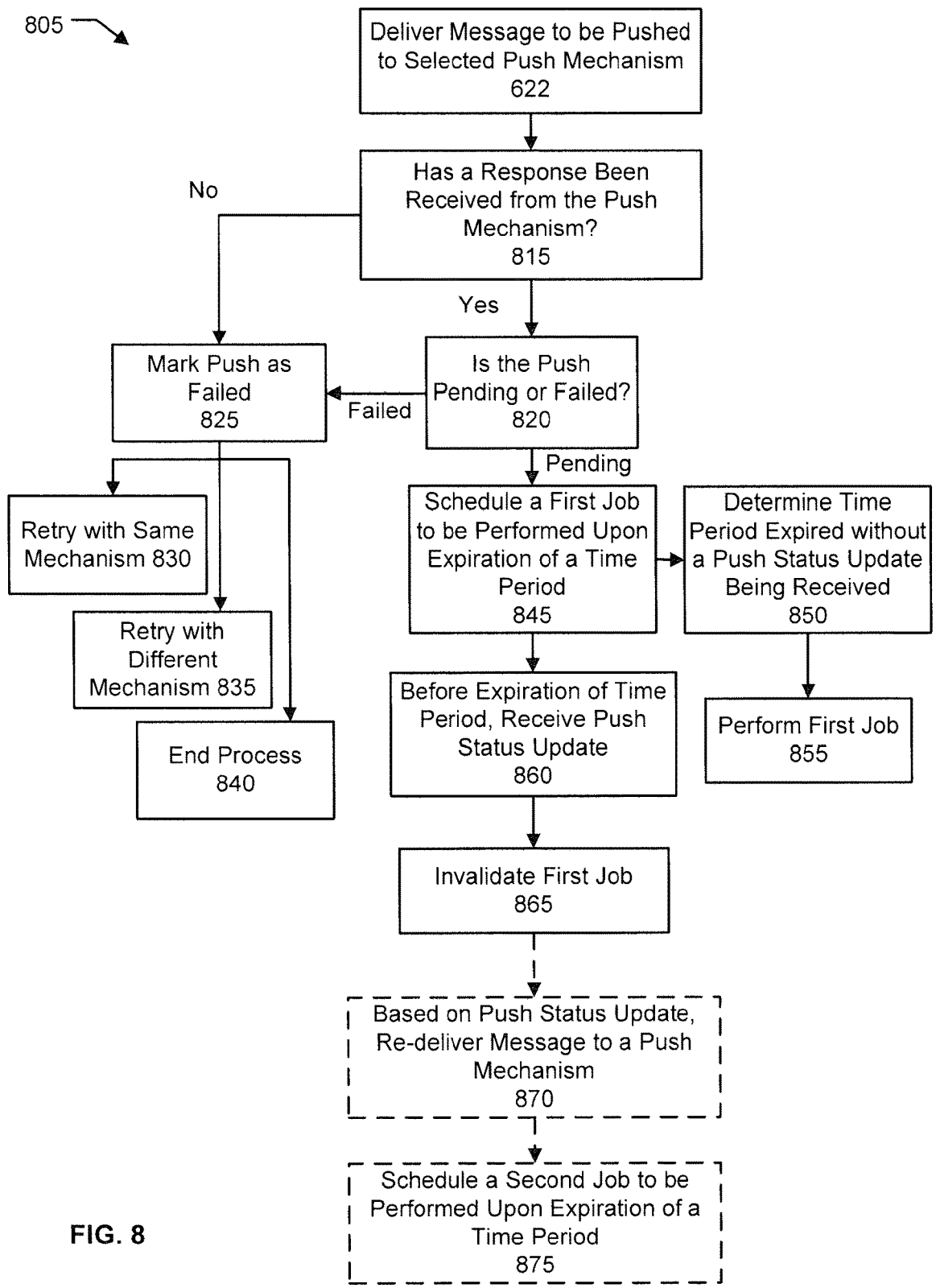
FIG. 8 shows a flow diagram of processes after the message has been delivered to the one or more selected push mechanisms.

More particularly, FIG. 8 shows an overall flow 805 for scheduling and tracking push message deliveries. In step 622, as described in the discussion accompanying FIG. 6, the routing module delivers the message to be pushed to the selected push mechanism. In a step 815, the tracking module determines whether a response has been received from the push mechanism regarding the delivery. If a response has been received, in a step 820, the tracking module determines whether the response indicates a failed push or a pending push.

If the response indicates a failed push, in a step 825, the tracking module marks or records the push as failed. For example, an entry may be made in push mechanism performance history database 450 (FIG. 4), an update may be made in a delivery tracking table indicating that the push failed, or both. If a push fails, the system may request that the selected push mechanism retry the push to the client (step 830), select a different push mechanism to push the message to the client (step 835), or terminate or end the process (step 840). In a specific implementation, if the push service receives an immediate failure result, the push service may either retry that mechanism after a period of time or try a next mechanism. Instructions as to whether the push service should retry the same mechanism or a different mechanism may be specified in a policy. The criteria for determining whether to use the same mechanism or a different mechanism may be based on the mechanism behavior or type of failure. For example, if there is an indication that the failure was critical or that the mechanism will be permanently inactive or inactive for a long period of time (e.g., several hours), a different mechanism may be used. If a given mechanism fails, the system may immediately perform the next step unless there is a timeout required (e.g., delay between retries).

The delay between retries may be about 10 seconds, but can range from about 3 seconds to about 30 seconds. This includes, for example, about 5, 10, 15, 20, 25, 29.9 seconds, or more than 30 seconds. The period of time may be less than 3 seconds. Having a delay between retries can help to prevent overloading of the push mechanism. The buffer of a push mechanism may have been filled with other push requests so waiting for a brief period of time before retrying the mechanism can provide some time for the buffer to clear, empty (or at least partially empty). Further, a particular provider may require a retry policy like exponential backoff; this is in part to avoid overwhelming the mechanism provider if it is having problems. The delay between retries may be specified in the message send request delivery profile or pre-determined by the system such as specified in a policy. Alternatively, upon receiving an immediate failure result, the push service system may immediately retry the push mechanism without waiting for a brief period of time.

In a specific implementation, a message send request delivery profile specifies a retry timeout that is an exponential backoff. The exponential backoff may indicate that progressively longer timeouts or delays between retries should be used. For example, the delay between first and second retries may be about 0.5 seconds, but the delay between second and third retries may be about 1 second, the delay between third and fourth retries about 2 seconds, the delay between fourth and fifth retries about 5 seconds, and so forth.

As shown in step 835, after determining that a push via a selected push mechanism has failed, the system may instead select a different push mechanism from among the set of push mechanism to push the message to the client device. The selection process of a different push mechanism may be similar to step 615 as shown in FIG. 6 and described in the discussion accompanying FIG. 6.

Retrying the push via the same push mechanism or selecting a different push mechanism to push provides a fallback strategy or plan to help ensure that a message is pushed to a client device. This can be beneficial in cases where the delivery profile indicates that the message is critical. Rather than relying on a single push mechanism to push the message, this feature allows for one or more backup push mechanisms to be selected. Thus, even if the single push mechanism is down, a critical message may still be able to be pushed to a device using a different push mechanism. This process of selecting the push mechanisms can occur automatically or without any intervention from the originating application server. For example, the application server can simply indicate that the message to be pushed is critical and the push service system will handle the routing to the appropriate push mechanism (or mechanisms) and any push failures. The push service system can implement the procedures and backup procedures, if needed, to help ensure that the message is pushed to the client.

Referring now to step 825, there can be several techniques for determining that a push has failed or that the selected push mechanism is unable to push the message to the mobile client device. As discussed above, one technique is the system having received an immediate failure result from the selected mechanism. Another technique for determining that a push has failed includes determining that the system has not received a response within a specified timeout period. For example, there may be a case where the system expects to receive a "success" notification. If the "success" notification is not received after a period of time (i.e., the system fails to receive a successful push notification from the selected push service during the time period), the system may move on to the next push mechanism (835) or retry the push attempt with the same mechanism (830). In a specific implementation, if no response is received and the scheduled timeout job runs on the push service, the push service either schedules the next step, or marks the message as failed if there are no next steps.

The timeout period is a pre-determined time period that provides a trigger for other activities to occur in the event that the system does not receive a response. In this specific implementation, upon delivering the push message to the push mechanism, the system sets a timer or clock. If the system does not receive a response within the pre-determined time period, i.e., the pre-determined time period lapses or expires without a response being received, the system determines that the push has failed. The time period may be user-configurable such as by an administrator.

The length of time or duration of the timeout period may vary based on factors such the as the delivery profile, policy information, client device information, carrier or network operator, network type, or combinations of these. The timeout period may be about 5 minutes, but can range from about 1 minute to about 30 minutes. This includes, for example, about 10, 15, 20, 25, 29.9 minutes, or more than 30 minutes. The timeout period may be less than 1 minute. The timeout period can act as a safeguard against delivery failures. For example, if the delivery profile accompanying the push request from the application server indicates that the push request is critical or urgent, there may be a short timeout period as compared to a delivery profile indicating that the push request is non-critical. This allows the system to quickly determine that a push has failed so that the system can move forward with any other contingency plans to contact the client device. As another example, some networks may be faster than other networks. For example, 4G networks are generally considered to be faster than 3G networks. Thus, the timeout period may be longer for a 3G network than a 4G network in order to provide additional time for the push to travel through the 3G network.

Referring now to step 820, the push service system may instead receive an indication that the push message delivered to the push mechanism is pending. In a specific implementation, if a given mechanism accepts a message for delivery, the system schedules a job in the future so that the system can time out if the delivery takes too long. In a specific implementation, the system counts forward, similar to a stopwatch, from when the push message is delivered to the push mechanism to determine when the timeout period expires. In another specific implementation, the system counts backwards, similar to a countdown timer, starting at the end of the timeout period to determine when the timeout period expires.

In a step 845, the push service system schedules a first job to be executed upon expiration of a time period. That is, the job is to be performed at some time in the future to handle the case where the message is not delivered or pushed in the period of time. If the time period expires or lapses without any status update being received on the push (step 850), the system in a step 855 executes or performs the scheduled first job. Performing the job may include marking the push as failed, requesting that push mechanism retry the push, or selecting a different push mechanism to perform the push.

Alternatively, in a step 860, before the time period expires, the tracking module may receive a status update on the push. The push status update may be received from the push mechanism. Alternatively, the push status update may be received from the application server that either initiated the message send request, or is related to the application server that initiated the message send request. For example, upon a successful push to the client, the client may connect to the application server, and the application server may then notify the push service system.

Having received the status update, in a step 865, the system invalidates the first job. Based on the status update, the system may mark the message as successful or delivered, mark the message as failed, request that the push mechanism retry the push, select a different push mechanism to attempt the push, or end the process. Specifically, if the status update indicates that the push has been successful, the system may end or abort the process. The process may also be ended if the status update indicates the push failed. Aborting the process can prevent any pushing of the message by the remaining chosen push delivery mechanisms.

If the push has failed, rather than ending the process, the system may instead request that the push mechanism retry the push, or select a different push mechanism to attempt the push. For example, in a specific implementation, based on a status update of a failed push, in a step 870, the system re-delivers the message to a push mechanism so that another attempt can be made to push the message to the client. The push mechanism may be the same push mechanism that was originally or initially selected or the push mechanism may be a different push mechanism. In a step 875, a second job is scheduled to be performed upon expiration of a time period. As discussed above, scheduling the job allows the system to time out if delivery takes too long. Steps 870 and 875 are shown in broken lines to indicate that these steps are optional. For example, these steps may not be performed if, for example, the status update indicates a successful push of the message to the client.

In other words, if the system receives status either from the push mechanism or from the application server before the timeout, the system may either cancel the first job or take steps to make sure that when the first job runs, it does not do anything. Cancelling a job can be expensive depending on the job queuing system so it may be preferable to let the timeout job run but detect that there is nothing to do. For example, it may take longer to search for the job in a queue and remove it than to mark metadata that the job will refer to when executed.

In a specific implementation, the system sets information on a message request for the push service to determine which timeout jobs are valid. If the push service tries to send a command via mechanism A, scheduling a timeout job for that mechanism, but before the timeout is reached the mechanism sends a status update to the push service indicating that the message cannot be delivered, the push service may then send a message using mechanism B, scheduling a timeout job for mechanism B. In this case, mechanism A's timeout job is still scheduled. If it is infeasible to remove the scheduled job for mechanism A, it is possible to leave it scheduled, but set data on the message indicating what timeout jobs are currently valid so that the timeout for mechanism A is ignored, but the timeout for mechanism B is accepted. The information could include a time of the next expected timeout (any timeout jobs that occur before that time are ignored). Alternatively, the system can queue each timeout job with an identifier and store a list of valid timeout identifiers on the message request, so that the system can simply modify the list of valid timeouts for a given request.

Thus, in a specific implementation, invalidating the job (step 865) includes canceling the job. In another specific implementation, a different technique is used to invalidate the job. In this specific implementation, a method includes delivering a message to a first push mechanism for the first push mechanism to push the message to a client. Scheduling a first timeout job associated with the message, where the first timeout job is to be performed upon expiration of a first time period. Before the expiration of the first time period, receiving a status update of a failed push from the first push mechanism. Delivering the message to a second push mechanism for the second push mechanism to push the message to the client. Scheduling a second timeout job associated with the message, where the second timeout job is to be performed upon expiration of a second time period.

In this specific implementation, a technique to invalidate the first timeout job includes marking metadata associated with the message to indicate that the second timeout job is valid. The method may further include marking the metadata to indicate that the first timeout job is invalid. In another specific implementation, the first timeout job is associated with a first identifier. The second timeout job is associated with a second identifier. In this specific implementation, a method to invalidate the first timeout job includes storing a list of valid timeout identifiers associated with the message. The list of valid timeout identifiers includes the second identifier associated with the second timeout job. The first identifier associated with the first timeout job is omitted from the list of valid timeout identifiers.

FIGS. 9-11 show some example flows 905, 1005, and 1105, respectively, for receiving feedback (e.g., status updates, push succeeded, or push failed) or delivery verification of a push to a client device. Feedback on the push may be received from the client device, API, or from the push mechanism. Specifically, FIG. 9 shows a flow for receiving feedback from a push mechanism. FIG. 10 shows a flow for receiving feedback from the application server. FIG. 11 shows a flow for receiving feedback from a client device.

Referring to FIG. 9, in a step 910, the tracking module receives feedback on the push from the push mechanism. In a step 915, the push service system updates the message state. The system may change the message state from a first state to a second state, different from the first state. For example, the first state may indicate that the message has been delivered to the push mechanism. The second state may indicate that the push mechanism has pushed the message to the client or that the push mechanism has failed to push the message to the client.

In a step 920, the system informs the application server of the updated message state. The system may send a notification to the application server. The notification may be an e-mail, text message, or any suitable notification. Notifications may be implemented as callbacks via registered handlers, such as an HTTP callback. In a step 925, based on the message status, the push service system may re-deliver the message such as in the case where the message push has failed. Alternatively, the push service system may stop scheduled jobs to re-deliver message such as in the case where the message push as succeeded.

It should be appreciated that the originating application server may query the push service system at any time for status updates. A feature of the system provides a level of fault tolerance to the application server. The push service system can notify if there are terminal errors preventing the message from being sent, and optionally on each step of the process. The system can re-deliver or retry if individual requests fail with no intervention from server. While the message delivery is in progress, the originating server can query the push service for the current status; or it may wait for a callback response from the push service.

Specifically, asynchronously, the push service can receive a response from the mechanism that specifies delivery status, e.g., specifies a successful push to the client. The application server may have confirmation of message delivery (e.g., the message is an indication for the client device to connect to the application server) and perform an HTTP callback informing the push service that the message has been delivered. In this case, the push service marks the message as delivered. The push service system may receive delivery confirmation from the application server. After receiving a message, the client device may contact the application server directly. At this point, the application server can notify the push service to provide confirmation of message delivery, thereby stopping further attempts to retry delivering the message or delivering the message via other mechanisms.

FIG. 10 shows a flow similar to FIG. 9, but in FIG. 10 in a step 1010, the system receives feedback on the push from the application server such as via an API. Generally, receiving feedback from the application server indicates a successful push to the client. That is, the client device having received the pushed message may contact the application server directly, which is generally the goal of the push—to tell the client to connect. The application server can then notify the push service system to provide confirmation of message delivery. In a step 1015, the system updates the message state to indicate that the message has been pushed successfully to the client. In a step 1020, the system cancels or otherwise stops or aborts any further attempts to retry delivering the message. The system may receive feedback from the application server that initiated the push request or the system may receive feedback from a different application server. For example, the client device may be instructed in the push message to connect to the different application server, rather than the application server that initiated the push request, and the different application server may provide the feedback to the system indicating that the attempted push was successful.

FIG. 11 shows a flow similar to FIGS. 9-10, but in FIG. 11, in a step 1110 the push service system receives feedback from the client device. Generally, receiving feedback from the client device indicates a successful push to the client. In a step 1115, the system updates the message status. In a step 1120, the system informs the application server of the message status. In a step 1125, the system stops any scheduled jobs to re-deliver the message.

Figure 12:
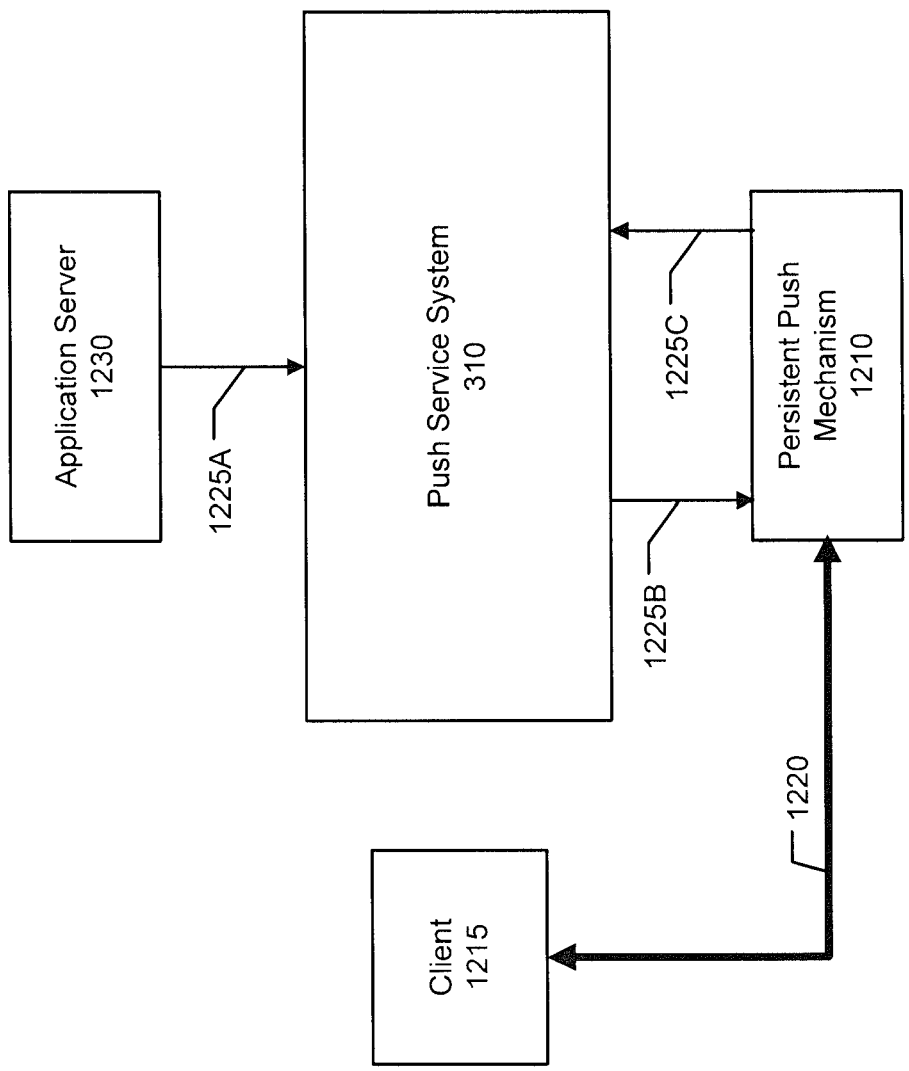
FIG. 12 shows a block diagram of a specific implementation of the push service system with a persistent push mechanism.

FIG. 12 shows a block diagram of a specific implementation of push service system 310 with a persistent push mechanism 1210. Typically, the persistent push mechanism may keep an outstanding connection open at all times between a client device 1215 and persistent push service 1210. This connection is shown as line 1220. The connection may use a lightweight protocol on top of TCP or other networking protocol. Because this service always knows whether a device is "online" or not, it has presence information, namely, whether or not the device is contactable. Such a mechanism can provide presence information about a device, which can be exposed to the push service system without having to send a message. Outstanding connections to a device can provide additional optimizations or benefits.

One benefit is that if the persistent push mechanism uses encryption, the push service system can cache transport layer security (TLS) parameters per-device to avoid having to re-negotiate them when a device temporarily disconnects. Another benefit is the ability to automatically tune network parameters, such as keep-alive parameters, based on network information the persistent push mechanism determines about a given device or information provided by the device. For example, different network operators may have different optimal network configurations because of different firewall settings, proxy settings, and so forth. In a specific implementation, the persistent push mechanism is referred to as the Lookout Cloudpush as provided by Lookout, Inc. of San Francisco, Calif.

If a push mechanism has the ability to determine presence, the push service system may request device presence before delivering the message to be pushed. A flow for interacting with a persistent push mechanism may be as follows:

Step 1 (1225A): Receive push request from application server 1230.

Step 2 (1225B): Request presence information regarding the client device from the persistent push mechanism.

Step 3 (1225C): Receive presence information response from the persistent push mechanism.

In a specific implementation, if a persistent push mechanism is available and the client device is "present" the push service system selects the persistent push mechanism to push the message. However, this is not necessarily always the case. For example, there may be a cost to use the persistent push mechanism. Thus, if the push request delivery profile indicates that a free push mechanism should be used, the push service system will not select such a persistent push mechanism.

This disclosure contemplates several embodiments of the push service system. In a first embodiment, the push mechanisms are external to the push service system. In a second embodiment, at least one of the push mechanisms is internal to or integrated with the push service system. In a specific implementation, the at least one push mechanism is a persistent push mechanism and may be referred to as the Lookout Cloudpush.

Figure 13:
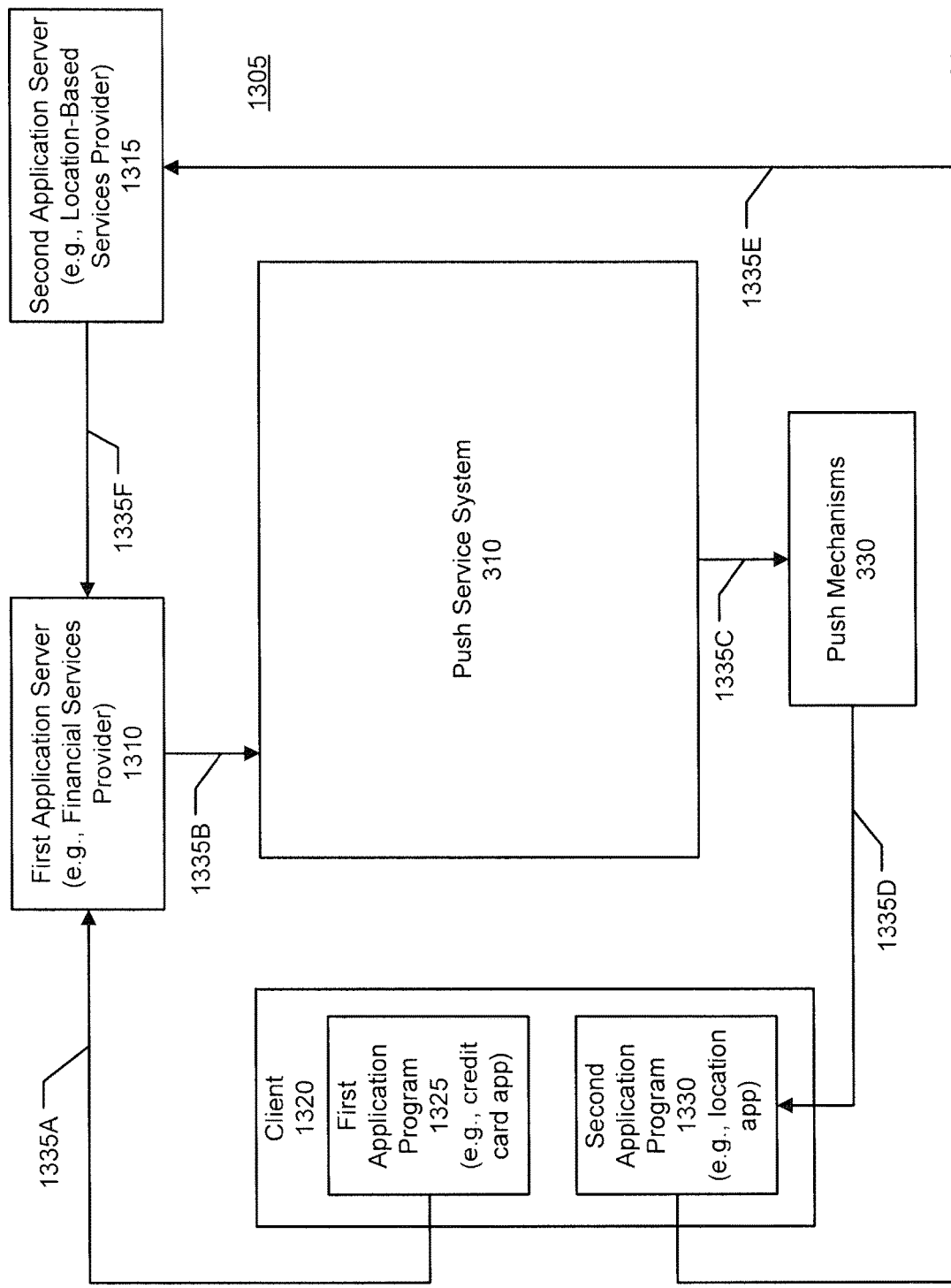
FIG. 13 shows a block diagram of a specific implementation of the push service system in connection with location-based services.

FIG. 13 shows a block diagram of a specific implementation of the push service system to facilitate location-based services. An example of where location-based services may be used is with antifraud services. In this example, there can be a financial transactions application on the client device such as a credit card application. When the credit card application is used to make a purchase it can be desirable to determine the location of the client device in order to authorize the purchase.

As shown in FIG. 13, an environment 1305 includes a first application server 1310, a second application server 1315, push service system 310, push mechanism providers 330, and a client 1320. The client includes a first application program 1325 and a second application program 1330. The first application program is associated with the first application server. The first application program and server may be referred to a consumer of location-based information. For example, the first application program may be a credit card application program and the first application server may facilitate the processing of credit card transactions by the credit card application program. As shown in FIG. 4, a push service system may include several modules and data stores. For ease of explanation, such components are not shown in the example of FIG. 13.

The second application program is associated with the second application server. The second application program and server may be referred to as a provider of location-based information. For example, the second application program may include client device locating services, e.g., Global Positioning System (GPS) related services and the second application server may facilitate such location-determining services. A specific example of such an application program and server is described in U.S. patent application Ser. No. 12/372,719, filed Feb. 17, 2009, which is incorporated by reference. A flow may be as follows:

Step 1 (1335A): The first application program on the client is used to make a purchase and the first application program sends a request to the first application server to verify the location of the client in order to authorize the purchase.

Step 2 (1335B): The push service system receives a request from the first application server for assistance in determining the location of the client.

Step 3 (1335C): The push service system selects a push mechanism provider and transmits a message to be pushed by the selected push mechanism provider to the client (or second application program on the client) instructing the client to connect to the second application server.

Step 4 (1335D): The push mechanism pushes the message to the client.

Step 5 (1335E): The client receives the message and connects to the second application server as instructed in the message. Upon connection, the second application server instructs the client via the second application program to determine its location and transmit the location to the second application server. The second application program receives the client location information.

Step 6 (1335F): The second application server transmits the client location information to the first application server which, based on the location information, determines whether or not the purchase should be authorized.

In specific embodiments, there is an application programming interface (API) that is provided. The API is referred to as a push messaging API. The Push Service exposes a messaging API to be used by one or more servers. The API provides an id that uniquely identifies a message from a server to a specific device; this unique ID is generated when the message is posted to the push service and returned to the server.

The push service may collapse a new request into an existing message in flight if it is directed from the same server to the same device with a service requirement that will be covered by the existing message. This allows the server to queue multiple messages with different service requirement profiles, letting the push service handle the logic to determine how to deliver them or to not deliver a given message to avoid sending too many messages to a given device. The server can make queries to the push service about a message by unique ID. For example, the application server may have a low-priority message to deliver, and may separately decide to send a high-priority message while the first is in transit.

Thus, in a specific implementation, a method includes receiving, by the push service system, a new push request including both a message to be pushed to a client device and prioritization criteria, determining by the system whether the new received push request matches any pending push requests having the same requester, the same mobile device and whether the prioritization criteria of the new received push request is met by the prioritization criteria of the pending push request, selecting by the system to combine the new received push request with the matching pending push request, and delivering by the system the message from the new received push request to be combined with the message from the matching pending push request to a delivery mechanism for an attempt at pushing the messages to the client device.

In a specific implementation, the API is REST-ful and may include one or more of: (1) creating a new message with specified destination device and service profile, (2) reading the status of an existing message, (3) updating a message to provide additional information, such as round trip delivery feedback, (4) deleting a message to cancel delivery. The push service can also provide status notifications. For example, the server can provide contact information to receive callbacks from push service. Callbacks may be made when the message reaches a terminal state (either success or failure).

Referring now to FIG. 4, in some cases, a client device may only support a single push mechanism. Below is an example flow of an application server sending to one mechanism:

(1) Application server posts a message send request to the push service asking for a message to be delivered to a device which supports only a single mechanism (e.g., iPhone via cloudpush).

(2) The push service returns a response to the server indicating an identifier for the message.

(3) The push service transmits the message to the supported mechanism.

(4) If the mechanism returns status immediately, update the message state to failed (with any details attached) and perform an HTTP callback to inform the server.

(5) If the mechanism responds asynchronously with status, update the message state and perform an HTTP callback to the server.

(6) If the mechanism does not respond with status but can be queried, poll the mechanism provider at a later point in time and perform an HTTP callback to the server if there is a state change.

(7) After successful round trip delivery and connection of the device to the server, the server may perform an HTTP callback to the push service to confirm delivery.

Alternatively, in other cases, a client device supports multiple mechanisms. Below is an example of an application server sending to multiple mechanisms:

(1) Server posts a message send request via HTTP to the push service asking for a message to be delivered to a device which supports more than one mechanism (e.g., an Android device supporting C2DM and SMS). The message send request specifies a reliable least-cost delivery profile.

(2) The push service returns a response to the server indicating an identifier for the message.

(3) The push service chooses the least expensive mechanism for initial delivery.

(4) The push service transmits the message to the chosen mechanism.

(5) If the mechanism responds with failure (synchronously or asynchronously), choose the next possible mechanism for delivery; return to step (4).

(6) If the mechanism does not respond within the required time window, choose the next possible mechanism for delivery; return to step (4).

(7) After each response from a mechanism, optionally perform an HTTP callback to the server to provide an update.

(8) If the message is confirmed to be delivered (e.g., if the mechanism supports this or the server receives a notification from the device), move message to a terminal success state and do not continue trying to send.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:
   receiving, by a mobile payment server, a payment request from a mobile communications device;
   generating, by the mobile payment server, a push request to verify a location of the mobile communications device, the push request including both a message to be pushed to the mobile communications device and a delivery profile that includes a push delivery requirement for pushing the message to the mobile communications device, the message including instructions which when executed will cause the mobile communications device to connect to a location determining server and the push delivery requirement including at least one attribute selected from a group of attributes comprising an attribute specifying a maximum cost for pushing the message to the mobile communications device, an attribute specifying a priority level of the message, and an attribute specifying a lowest cost push service for use;
   transmitting, by the mobile payment server, the push request to a push service server, wherein the push service server:
      selects a push service from a plurality of available push services to push the message included in the push request to the mobile communications device, the selection of the push service being based on the push delivery requirement included in the delivery profile in the push request and being further based on information about the mobile communications device to which the message is to be pushed, and
      transmits the message to the selected push service, the selected push service pushing the message to the mobile communications device, wherein the mobile communications device (1) connects with the location determining server in response to executing the instructions included in the message and (2) transmits location information to the location determining server;
   receiving, by the mobile payment server, the location information of the mobile communications device from the location determining server; and
   determining, by the mobile payment server, whether or not to authorize the requested payment based on the received location of the mobile communications device.

2. The method of claim 1, wherein selecting the push service further includes selecting the push service based on past performance of the push service.

3. The method of claim 1, wherein receiving the location information of the mobile communications device includes receiving multiple types of location data.

4. The method of claim 3, the multiple types of location data including at least two types of location data selected from a group comprising GPS data, Wi-Fi access point signal information, cell-tower signal information, and radio signal information.

5. The method of claim 1, wherein
   the mobile communications device:
   displays a request to send the location information of the mobile communications device to the mobile payment server by a location feature on the mobile communications device, after connecting with the location determining server; and
   receives user input indicating consent to send the location information to the mobile payment server, wherein the location information of the mobile communications device is transmitted by the mobile communications device to the location determining server in response to the receiving user input indicating consent.

6. The method of claim 5, wherein the location feature is part of a location application on the mobile communications device.

7. The method of claim 5, wherein the location feature is included in a payment application on the mobile communications device.

8. The method of claim 1, wherein the push service server, after receiving the pushed request, further:
   determines that the selected push service is unable to push the message to the mobile communications device within a specified time period;
   selects from among the plurality of available push services, a second push service, different from the selected push service, to push the message to the mobile communications device; and
   transmits the message to the second push service to push the message to the mobile communications device.

9. The method of claim 1, wherein the step of determining whether or not to authorize the requested payment further includes comparing the location of the mobile communications device to a list of known locations for the mobile communications device, and authorizing the requested payment when the location of the mobile communications device matches a known location on the list of known locations for the mobile communications device.

10. A system comprising:
    a mobile payment server including a first processor, the mobile payment server programmed to:
       receive a payment request from a mobile communications device; generate a push request to verify a location of the mobile communications device, the push request including both a message to be pushed to the mobile communications device and a delivery profile that includes a push delivery requirement for pushing the message to the mobile communications device, the message including instructions which when executed will cause the mobile communications device to connect to a location determining server and the push delivery requirement including at least one attribute selected from a group of attributes comprising an attribute specifying a maximum cost for pushing the message to the mobile communications device, an attribute specifying a priority level of the message, and an attribute specifying a lowest cost push service for use;
       transmit the push request to a push service server, wherein the push service server includes a second processor, and the push service server is programmed to:
          select a push service from a plurality of available push services to push the message included in the push request to the mobile communications device, the selection of the push service being based on the push delivery requirement included in the delivery profile in the push request and being further based on information about the mobile communications device to which the message is to be pushed, and
          transmit the message to the selected push service, the selected push service pushing the message to the mobile communications device, wherein the mobile communications device (1) connects with the location determining server in response to executing the instructions included in the message and (2) transmits location information to the location determining server;

the mobile payment server further programmed to:
receive the location information of the mobile communications device from the location determining server; and
determine whether or not to authorize the requested payment based on the received location of the mobile communications device.

11. The system of claim 10, wherein selecting the push service further includes selecting the push service based on past performance of the push service.

12. The system of claim 10, wherein receiving the location information of the mobile communications device includes receiving multiple types of location data.

13. The system of claim 12, the multiple types of location data including at least two types of location data selected from a group comprising of GPS data, Wi-Fi access point signal information, cell-tower signal information, and radio signal information.

14. The system of claim 10, wherein the mobile communications device further:
displays a request to send the location information of the mobile communications device to the mobile payment server by a location feature on the mobile communications device, after connecting with the location determining server; and
receives user input indicating consent to send the location information to the mobile payment server, wherein the location information of the mobile communications device is transmitted by the mobile communications device to the location determining server in response to the receiving user input indicating consent.

15. The system of claim 14, wherein the location feature is part of at least one application selected from a group of applications comprising a location application on the mobile communications device and a payment application on the mobile communications device.

16. The system of claim 10, wherein the push service server, after receiving the pushed request, further:
determines that the selected push service is unable to push the message to the mobile communications device within a specified time period;
selects from among the plurality of available push services, a second push service, different from the selected push service, to push the message to the mobile communications device; and
transmits the message to the second push service to push the message to the mobile communications device.

17. The system of claim 10, wherein determining whether or not to authorize the requested payment further includes comparing the location of the mobile communications device to a list of known locations for the mobile communications device, and authorizing the requested payment when the location of the mobile communications device matches a known location on the list of known locations for the mobile communications device.

18. One or more non-transitory computer-readable storage media having stored thereon computer instructions comprising:
a first set of instructions which, when executed by a first processor of a mobile payment server, cause the first processor to perform steps including:
receiving a payment request from a mobile communications device;
generating a push request to verify a location of the mobile communications device, the push request including both a message to be pushed to the mobile communications device and a delivery profile that includes a push delivery requirement for pushing the message to the mobile communications device, the message including instructions which when executed will cause the mobile communications device to connect to a location determining server and the push delivery requirement including at least one attribute selected from a group of attributes comprising an attribute specifying a maximum cost for pushing the message to the mobile communications device, an attribute specifying a priority level of the message, and an attribute specifying a lowest cost push service for use;
transmitting the push request to a push service server, wherein a second set of instructions which, when executed by a second processor of the push service server, cause the second processor to perform steps including:
selecting a push service from a plurality of available push services to push the message included in the push request to the mobile communications device, the selection of the push service being based on the push delivery requirement included in the delivery profile in the push request and being further based on information about the mobile communications device to which the message is to be pushed, and
transmitting the message to the selected push service, the selected push service pushing the message to the mobile communications device, wherein the mobile communications device (1) connects with the location determining server in response to executing the instructions included in the message and (2) transmits location information to the location determining server;
the first set of instructions which, when executed by the first processor of the mobile payment server, further cause the first processor to perform steps including:
receiving the location information of the mobile communications device from the location determining server; and
determining whether or not to authorize the requested payment based on the received location of the mobile communications device.

19. The one or more non-transitory computer-readable storage media of claim 18, wherein selecting the push service further includes selecting the push service based on past performance of the push service.

20. The one or more non-transitory computer-readable storage media of claim 18, wherein receiving the location information of the mobile communications device includes receiving multiple types of location data.

21. The one or more non-transitory computer-readable storage media of claim 20, the multiple types of location data including at least two types of location data selected from a group comprising GPS data, Wi-Fi access point signal information, cell-tower signal information, and radio signal information.

22. The one or more non-transitory computer-readable storage media of claim 18, wherein determining whether or not to authorize the requested payment further includes comparing the location of the mobile communications device to a list of known locations for the mobile communications device, and authorizing the requested payment when the location of the mobile communications device matches a known location on the list of known locations for the mobile communications device.

\* \* \* \* \*